US011413931B2

(12) United States Patent
Yano et al.

(10) Patent No.: US 11,413,931 B2
(45) Date of Patent: Aug. 16, 2022

(54) VEHICLE-MOUNTED TEMPERATURE CONTROLLER

(71) Applicant: TOYOTA JIDOSHA KABUSHIKI KAISHA, Aichi-ken (JP)

(72) Inventors: Masatoshi Yano, Hadano (JP); Yuji Miyoshi, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 256 days.

(21) Appl. No.: 16/843,893

(22) Filed: Apr. 9, 2020

(65) Prior Publication Data

US 2020/0324611 A1 Oct. 15, 2020

(30) Foreign Application Priority Data

Apr. 10, 2019 (JP) .............................. JP2019-075010

(51) Int. Cl.
*B60H 1/00* (2006.01)
*B60H 1/32* (2006.01)

(52) U.S. Cl.
CPC ......... *B60H 1/004* (2013.01); *B60H 1/00007* (2013.01); *B60H 1/00278* (2013.01); *B60H 1/00428* (2013.01); *B60H 1/3211* (2013.01); *B60H 2001/00307* (2013.01)

(58) Field of Classification Search
CPC ............................ B60H 1/004; B60H 1/00007; B60H 1/00278; B60H 1/00428; B60H 1/3211; B60H 2001/00307

USPC ....................................................... 165/202
See application file for complete search history.

(56) References Cited

U.S. PATENT DOCUMENTS

| | | | | |
|---|---|---|---|---|
| 2016/0318499 A1* | 11/2016 | Yamanaka | .............. | B60L 58/27 |
| 2016/0332505 A1* | 11/2016 | Yamanaka | ......... | B60H 1/00385 |
| 2016/0339767 A1* | 11/2016 | Enomoto | .............. | F25B 29/003 |
| 2017/0028813 A1* | 2/2017 | Enomoto | ........... | B60H 1/00899 |

FOREIGN PATENT DOCUMENTS

| | | |
|---|---|---|
| JP | 2006321389 A | 11/2006 |
| JP | 2009-180103 A | 8/2009 |

* cited by examiner

*Primary Examiner* — Davis D Hwu
(74) *Attorney, Agent, or Firm* — Hauptman Ham, LLP

(57) ABSTRACT

A vehicle-mounted temperature controller includes a first heat circuit having a heat exchanger for a heat generating device and a first heat exchanger; a second heat circuit having a heat medium flow path of an engine and a second heat exchanger; and a refrigeration circuit having the first heat exchanger to make the refrigerant evaporate and the second heat exchanger to make the refrigerant condense. A circulation mode control device control a circulation mode so that the second heat medium raised in temperature by absorbing heat from the refrigerant at the second heat exchanger flows into the flow path, when the engine is stopped and heat is discharged from the heat generating device to the first heat medium in the heat exchanger for the heat generating device and heat is absorbed from the first heat medium to the refrigerant in the first heat exchanger.

4 Claims, 13 Drawing Sheets

VEHICLE-MOUNTED TEMPERATURE CONTROLLER

RELATED APPLICATIONS

The present application claims priority of Japanese Patent Application No. 2019-075010, filed Apr. 10, 2019, the disclosure of which is hereby incorporated by reference herein in its entirety.

FIELD

The present disclosure relates to a vehicle-mounted temperature controller.

BACKGROUND

In the past, a vehicle-mounted temperature controller provided with a refrigeration circuit and a high temperature circuit has been proposed (for example, PTL 1). The refrigeration circuit is configured so as to realize a refrigeration cycle by circulation of a refrigerant. The high temperature circuit has a heater core used for heating the inside of a passenger compartment. In this vehicle-mounted temperature controller, the refrigeration circuit and the high temperature circuit share a single heat exchanger. This heat exchanger transfers heat from the refrigerant to cooling water of the high temperature circuit to make the refrigerant of the refrigeration circuit condense.

In particular, in the vehicle-mounted temperature controller described in PTL 1, the vehicle mounting the vehicle-mounted temperature controller is a hybrid vehicle. The high temperature circuit is connected to the cooling water flow path of the internal combustion engine. Further, in this vehicle-mounted temperature controller, when the SOC of the battery is low and the temperature of the cooling water is low, the refrigeration circuit is driven to transfer heat from the refrigerant to the cooling water at the heat exchanger, and the cooling water raised in temperature is supplied to the cooling water flow path of the internal combustion engine, in order to warm up the stopped internal combustion engine.

CITATIONS LIST

Patent Literature

[PTL 1] Japanese Unexamined Patent Publication No. 2009-180103

SUMMARY

Technical Problem

In this regard, in the refrigeration circuit of the vehicle-mounted temperature controller described in PTL 1, when warming up the internal combustion engine, heat is absorbed from the outside air and is discharged to the cooling water of the high temperature circuit. At this time, the temperature of the outside air is not much higher than the temperature of the cooling water of the warmed up internal combustion engine, and therefore to raise the temperature of the high temperature circuit, it is necessary to operate the compressor of the refrigeration circuit at a high load. Therefore, in the refrigeration circuit, the necessary energy required is high.

On the other hand, for example, a hybrid vehicle mounts a motor, power control unit (PCU), battery, or other heat generating device generating heat during operation. In such a heat generating device, in general, if the temperature is excessively high, the performance thereof decreases or deteriorates. Therefore, such a heat generating device requires cooling during operation.

In consideration of the above problem, an object of the present disclosure is to provide a vehicle-mounted temperature controller able to simultaneously realize reduction of the energy necessary for driving a refrigeration circuit in warming up an internal combustion engine and suppression of excessive temperature rise of a heat generating device.

Solution to Problem

The present invention has as its gist the following.

(1) A vehicle-mounted temperature controller, comprising:
  a first heat circuit having a heat exchanger for a heat generating device, exchanging heat with the heat generating device, and having a first heat exchanger, and configured so that a first heat medium is circulated through them,
  a second heat circuit having a heat medium flow path of an internal combustion engine and having a second heat exchanger, and configured so that a second heat medium is circulated through them, and
  a refrigeration circuit having the first heat exchanger making a refrigerant absorb heat from the first heat medium to make the refrigerant evaporate and the second heat exchanger making the refrigerant discharge heat to the second heat medium to make the refrigerant condense, and configured to realize a refrigeration cycle by the refrigerant being circulated through them, wherein
  the second heat circuit further has a circulation mode control device controlling a mode of circulation of the second heat medium in the second heat circuit, and
  the circulation mode control device performs stopping control for controlling the circulation mode so that the second heat medium raised in temperature by absorbing heat from the refrigerant at the second heat exchanger flows into the heat medium flow path of the internal combustion engine, when the internal combustion engine is stopped and heat is discharged from the heat generating device to the first heat medium in the heat exchanger for the heat generating device and heat is absorbed from the first heat medium to the refrigerant in the first heat exchanger.

(2) The vehicle-mounted temperature controller according to above (1), wherein in the stopping control, the circulation mode control device controls the circulation mode so that even when the internal combustion engine is stopped and heat is discharged from the heat generating device to the first heat medium in the heat exchanger for the heat generating device and heat is absorbed from the first heat medium to the refrigerant in the first heat exchanger, if the temperature of the second heat medium in the heat medium flow path of the internal combustion engine is higher than a predetermined upper limit temperature, the second heat medium does not flow into the heat medium flow path of the internal combustion engine.

(3) The vehicle-mounted temperature controller according to above (1) or (2), wherein
  the second heat circuit further has a radiator exchanging heat between the atmosphere and the second heat medium,
  the circulation mode control device is configured to control a ratio of the second heat medium flowing out from the second heat exchanger to the radiator and to the heat medium flow path of the internal combustion engine, and in the stopping control, the circulation mode control device controls the ratio so that when the internal combustion engine is stopped and heat is discharged from the heat generating device to the first heat medium in the heat exchanger for the heat generating device and heat is absorbed from the first heat medium to the refrigerant in the first heat exchanger, if the temperature of the second heat medium in the heat medium flow path of the internal combustion engine is relatively high, compared to if the temperature of the second heat medium is relatively low, the ratio of the second heat medium flowing into the radiator is higher.

(4) The vehicle-mounted temperature controller according to any one of above (1) to (3), wherein the vehicle-mounted temperature controller is mounted in a vehicle having the internal combustion engine and a motor as drive sources, and the stopping control is performed when the internal combustion engine is stopped and the vehicle is driven by the motor.

Advantageous Effects of Invention

According to the present disclosure, there is provided a vehicle-mounted temperature controller able to simultaneously realize reduction of the energy necessary for driving a refrigeration circuit in warming up an internal combustion engine and suppression of excessive temperature rise of a heat generating device.

DESCRIPTION OF EMBODIMENTS

Figure 1:
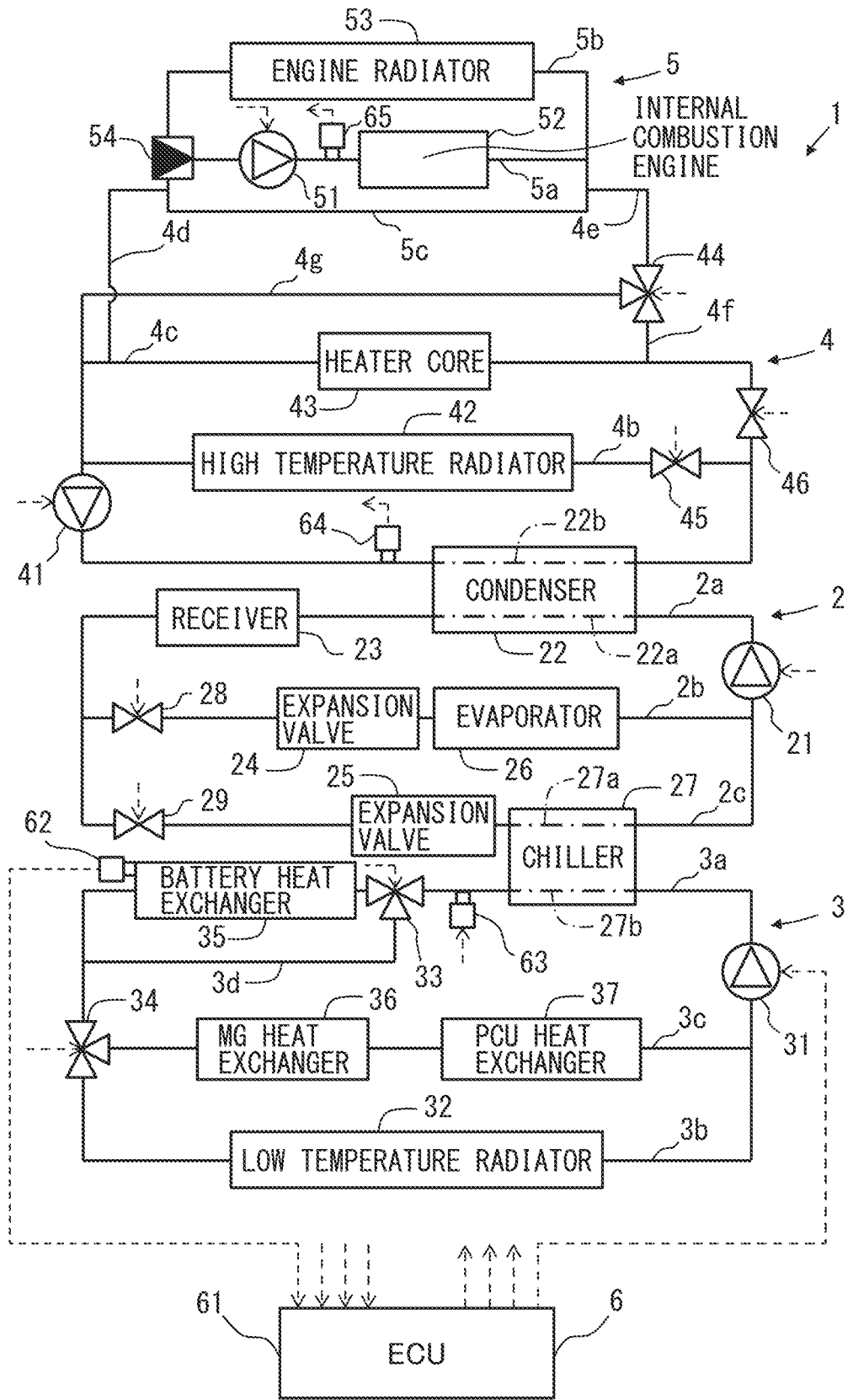
FIG. 1 is a view of the configuration schematically showing a vehicle-mounted temperature controller.

Below, referring to the drawings, embodiments will be explained in detail. Note that, in the following explanation, similar components are assigned the same reference signs.

Configuration of Vehicle-Mounted Temperature Controller

Figure 2:
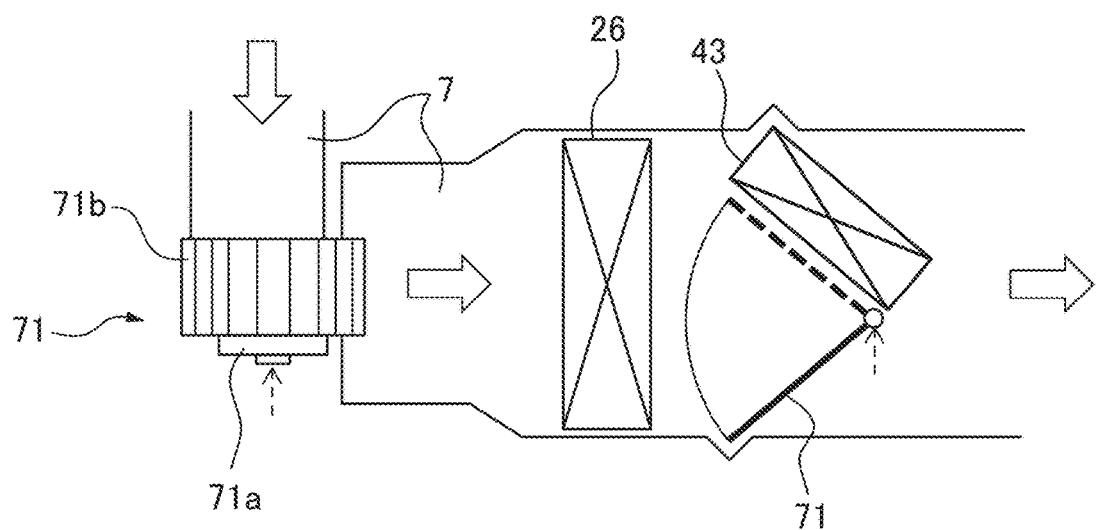
FIG. 2 is a view of the configuration schematically showing an air passage for air-conditioning a vehicle mounting the vehicle-mounted temperature controller.
Figure 3:
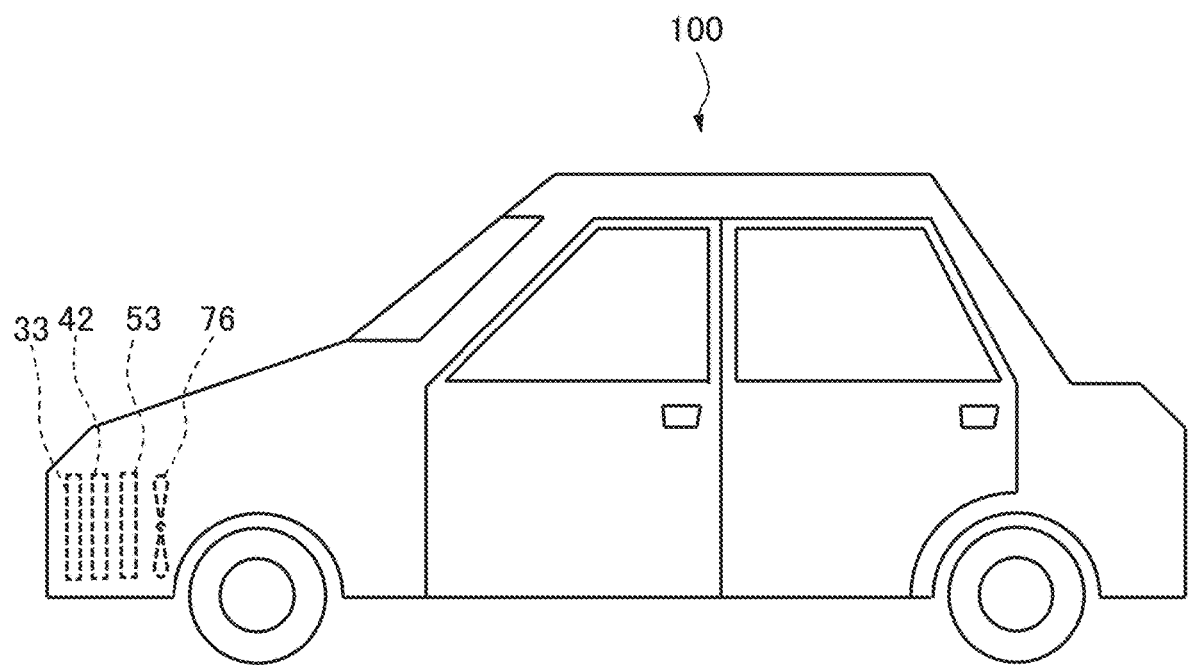
FIG. 3 is a view schematically showing the vehicle mounting the vehicle-mounted temperature controller.

Referring to FIGS. 1 to 3, the configuration of a vehicle-mounted temperature controller 1 according to a first embodiment will be explained. FIG. 1 is a view of the configuration schematically showing the vehicle-mounted temperature controller 1. In the present embodiment, the vehicle-mounted temperature controller 1 is particularly mounted in a hybrid vehicle driven by a motor (including a motor-generator (MG)) and internal combustion engine. Note that an example of a hybrid vehicle having a MG will be explained below.

The vehicle-mounted temperature controller 1 includes a refrigeration circuit 2, low temperature circuit (first heat circuit) 3, high temperature circuit (second heat circuit) 4 having engine cooling circuit 5, and control device 6.

First, the refrigeration circuit 2 will be explained. The refrigeration circuit 2 includes a compressor 21, refrigerant piping 22a of a condenser 22, receiver 23, first expansion valve 24, second expansion valve 25, evaporator 26, refrigerant piping 27a of the chiller 27, first solenoid regulating valve 28, and second solenoid regulating valve 29. The refrigeration circuit 2 is configured to realize a refrigeration cycle by circulation of a refrigerant through these components. For the refrigerant, for example, a hydrofluorocarbon (for example, HFC-134a) or any other substance generally used as a refrigerant in the refrigeration cycle is used.

The refrigeration circuit 2 is divided into a refrigerant basic flow path 2a, evaporator flow path 2b, and chiller flow path 2c. The evaporator flow path 2b and the chiller flow path 2c are provided parallel to each other and are respectively connected to the refrigerant basic flow path 2a.

At the refrigerant basic flow path 2a, the compressor 21, the refrigerant piping 22a of the condenser 22, and receiver 23 are provided in that order in a direction of circulation of the refrigerant. At the evaporator flow path 2b, the first solenoid regulating valve 28, the first expansion valve 24, and the refrigerant piping 27a of the evaporator 26 are provided in that order in a direction of circulation of the refrigerant. In addition, at the chiller flow path 2c, the second solenoid regulating valve 29, the second expansion valve 25, and the chiller 27 are provided in that order.

At the refrigerant basic flow path 2a, the refrigerant flows regardless of the opening/closing of the first solenoid regulating valve 28 and the second solenoid regulating valve 29. If the refrigerant flows to the refrigerant basic flow path 2a, the refrigerant flows through the compressor 21, the refrigerant piping 22a of the condenser 22, and the receiver 23 in that order. At the evaporator flow path 2b, the refrigerant flows when the first solenoid regulating valve 28 is opened. If the refrigerant flows to the evaporator flow path 2b, the refrigerant flows through the first solenoid regulating valve 28, the first expansion valve 24, and the refrigerant piping 27a of the evaporator 26 in that order. The refrigerant flows to the chiller flow path 2c when the second solenoid regulating valve 29 is opened. If the refrigerant flows to the chiller flow path 2c, the refrigerant flows through the second solenoid regulating valve 29, the second expansion valve 25, and the chiller 27 in that orders.

The compressor 21 functions as a compressor compressing the refrigerant to raise it in temperature. In the present embodiment, the compressor 21 is an electrically driven type, and is configured so that the discharge capacity can be changed steplessly by adjustment of the electric power supplied to the compressor 21. In the compressor 21, the mainly gaseous refrigerant with low temperature and low pressure flowing out from the evaporator 26 or the chiller 27 is adiabatically compressed, whereby it is changed to a mainly gaseous refrigerant with high temperature and high pressure.

The condenser 22 is provided with the refrigerant piping 22a and cooling water piping 22b. The condenser 22 functions as a second heat exchanger for discharging heat from the refrigerant to the cooling water of the high temperature circuit 4 to cause the refrigerant to condense. In the present embodiment, the condenser 22 exchanges heat between the refrigerant flowing through the refrigerant piping 22a and the cooling water flowing through the later explained cooling water piping 22b and transfers the heat from the refrigerant to this cooling water. The refrigerant piping 22a of the condenser 22 functions as a condenser condensing the refrigerant in the refrigeration cycle. Further, in the refrigerant piping 22a of the condenser 22, the mainly gaseous refrigerant with high temperature and high pressure, flowing out from the compressor 21, is changed to mainly liquid refrigerant with high temperature and high pressure by being isobarically cooled.

The receiver 23 stores the refrigerant condensed by the refrigerant piping 22a of the condenser 22. Further, in the condenser 22, not necessarily all of the refrigerant can be liquefied, therefore the receiver 23 is configured to separate the gas and liquid. Only liquid refrigerant, from which the gaseous refrigerant is separated, flows out from the receiver 23. Note that, instead of the receiver 23, the refrigeration circuit 2 may also use a sub cool type condenser housing a gas-liquid separator as the condenser 22.

The first expansion valve 24 and the second expansion valve 25 functions as a expander for making the refrigerant expand. These expansion valves 24 and 25 are provided with small diameter passages, and spray refrigerant from the small diameter passages to make the pressure of the refrigerant rapidly decrease. The first expansion valve 24 sprays a mist of liquid refrigerant supplied from the receiver 23 into the evaporator 26. Similarly, the second expansion valve 25 sprays a mist of liquid refrigerant supplied from the receiver 23 into the refrigerant piping 27a of the chiller 27. At these expansion valves 24 and 25, the liquid refrigerant with high temperature and high pressure, flowing out from the receiver 23, is depressurized and partially vaporizes, whereby it is changed to a mist-like refrigerant with low temperature and low pressure. Note that, the expansion valves may be mechanical type expansion valves with fixed superheating degrees or may be electrical type expansion valves able to adjust the superheating degrees. Further, if possible to make the refrigerant expand to reduce the pressure, for example, ejectors or other devices may be used as the expander, instead of the first expansion valve 24 and the second expansion valve 25.

The evaporator 26 functions as an evaporator causing the refrigerant to evaporate. Specifically, the evaporator 26 makes the refrigerant absorb heat from the air surrounding the evaporator 26 to make the refrigerant evaporate. Therefore, in the evaporator 26, the mist-like refrigerant with low temperature and low pressure, flowing out from the first expansion valve 24 is changed to a gaseous refrigerant with low temperature and low pressure, by evaporation. As a result, the air surrounding the evaporator 26 can be cooled and the passenger compartment can be cooled.

The chiller 27 is provided with the refrigerant piping 27a and the cooling water piping 27b. The chiller 27 functions as a first heat exchanger for making the refrigerant absorb heat from the cooling water of the later explained low temperature circuit 3 to evaporate the refrigerant. In the present embodiment, the chiller 27 exchanges heat between the cooling water flowing through the later explained cooling water piping 27b and the refrigerant flowing through the refrigerant piping 27a, and transfers heat from this cooling water to the refrigerant. The refrigerant piping 27a of the chiller 27 functions as an evaporator for making the refrigerant evaporate. Further, at the refrigerant piping 27a of the chiller 27, the mist-like refrigerant with low temperature and low pressure, flowing out from the second expansion valve 25, evaporates, whereby it is changed to a gaseous refrigerant with low temperature and low pressure. As a result, the cooling water of the low temperature circuit 3 is cooled.

The first solenoid regulating valve 28 and the second solenoid regulating valve 29 are used for changing the circulation mode of refrigerant in the refrigeration circuit 2. The larger the opening degree of the first solenoid regulating valve 28, the greater the amount of the refrigerant flowing into the evaporator flow path 2b. Accordingly, the amount of refrigerant flowing into the evaporator 26 becomes greater. Further, the larger the opening degree of the second solenoid regulating valve 29, the greater the amount of refrigerant flowing into the chiller flow path 2c and accordingly the greater the amount of refrigerant flowing into the chiller 27. Note that, in the present embodiment, the solenoid regulating valve 28 is configured as a valve able to be adjusted in opening degree, but it may also be an on-off valve switched between an opened state and a closed state. Further, instead of the first solenoid regulating valve 28 and the second solenoid regulating valve 29, it is also possible to provide a three-way valve able to make the refrigerant from the refrigerant basic flow path 2a selectively flow into only the evaporator flow path 2b, only the chiller flow path 2c, and/or both. Therefore, if possible to adjust the flow rate from the refrigerant basic flow path 2a to the evaporator flow path 2b and the chiller flow path 2c, some sort of valve may also be provided instead of these solenoid regulating valves 28 and 29.

Next, the low temperature circuit 3 will be explained. The low temperature circuit 3 includes a first pump 31, the cooling water piping 27b of the chiller 27, a low temperature radiator 32, first three-way valve 33, and second three-way valve 34. In addition, the low temperature circuit 3 includes the battery heat exchanger 35, MG heat exchanger 36, and PCU heat exchanger 37. In the low temperature circuit 3, the cooling water circulates through these components Note that, the cooling water is one example of the first heat medium circulating in the low temperature circuit 3. Inside the low temperature circuit 3, any other heat medium may be used instead of the cooling water.

The low temperature circuit 3 is divided into a low temperature basic flow path 3a, low temperature radiator flow path 3b, and heat generating device flow path 3c. The low temperature radiator flow path 3b and the heat generating device flow path 3c are provided parallel to each other and are respectively connected to the low temperature basic flow path 3a.

The low temperature basic flow path 3a is provided with, in a direction of circulation of cooling water, the first pump 31, the cooling water piping 27b of the chiller 27, and the battery heat exchanger 35 in that order. Further, at the low temperature basic flow path 3a, a bypass flow path 3d is connected so as to bypass the battery heat exchanger 35. In the present embodiment, the bypass flow path 3d is connected at one end between the chiller 27 and battery heat exchanger 35 in the direction of circulation of cooling water and is connected at the other end to the downstream side of the battery heat exchanger 35 in the above direction. At the connection part of the low temperature basic flow path 3a and the bypass flow path 3d, a first three-way valve is provided.

Further, the low temperature radiator flow path 3b is provided with the low temperature radiator 32. At the heat generating device flow path 3c, the MG heat exchanger 36 and PCU heat exchanger 37 are provided in that order in the direction of circulation of cooling water. The heat generating device flow path 3c may also be provided with a heat exchanger exchanging heat with heat generating device other than the battery, MG and power control unit (PCU). Between the low temperature basic flow path 3a and low temperature radiator flow path 3b and the heat generating device flow path 3c, a second three-way valve 34 is provided.

The first pump 31 pumps the cooling water circulating through the low temperature circuit 3. In the present embodiment, the first pump 31 is electrically driven water pumps, and is configured so as to be able to be changed in discharge capacities steplessly by adjustment of the electric power supplied to the first pump 31.

The low temperature radiator 32 is a heat exchanger exchanging heat with the cooling water circulating through the low temperature circuit 3 and the air outside of the vehicle 100 (outside air). The low temperature radiator 32 is configured to discharge heat from the cooling water to the outside air when the temperature of the cooling water is higher than the temperature of the outside air and to absorb heat from the outside air to the cooling water when the temperature of the cooling water is lower than the temperature of the outside air.

The first three-way valve 33 is configured so that the cooling water flowing out from the cooling water piping 27b of the chiller 27 flows selectively into the battery heat exchanger 35 or the bypass flow path 3e. In the low temperature basic flow path 3a, when the first three-way valve 33 is set at the battery heat exchanger 35 side, the cooling water flows through the first pump 31, the cooling water piping 27b of the chiller 27, and the battery heat exchanger 35 in that order of the components. On the other hand, when the first three-way valve 33 is set to the bypass flow path 3d side, the cooling water does not circulate through the battery heat exchanger 35, therefore flows through only the first pump 31 and the chiller 27.

The second three-way valve 34 is configured so that the refrigerant flowing out from the low temperature basic flow path 3a selectively flows between the low temperature radiator flow path 3b and the heat generating device flow path 3c. If the second three-way valve 34 is set to the low temperature radiator flow path 3b side, the cooling water flowing out from the low temperature basic flow path 3a flows through the low temperature radiator 32. On the other hand, if the second three-way valve 34 is set to the heat generating device flow path 3c side, the cooling water flowing out from the low temperature basic flow path 3a flows through these MG heat exchanger 36 and PCU heat exchanger 37 in the order of these components. In addition, if able to set the second three-way valve 34 so that the cooling water flows to both, part of the cooling water flowing out from the low temperature basic flow path 3a flows through the low temperature radiator 32, while the remainder flows through the MG heat exchanger 36 and PCU heat exchanger 37 in the order of these components.

Note that, if possible to suitably adjust the flow rate of the cooling water flowing to the battery heat exchanger 35 and bypass flow path 3d, an adjusting valve or on-off valve or other adjusting device may be used, instead of the first three-way valve 33. Similarly, if possible to suitably adjust the flow rate of the cooling water flowing into the low temperature radiator flow path 3b and heat generating device flow path 3c, an adjusting valve or on-off valve or other adjusting device may be used, instead of the second three-way valve 34.

The battery heat exchanger 35 is configured so as to exchange heat with the battery (not shown) of the vehicle 100. Specifically, the battery heat exchanger 35, for example, is provided with piping provided around the battery, and is configured so that heat is exchanged between the cooling water flowing through this piping and the battery. The battery is used for storing electric power generated by the MG or electrical power supplied from outside of the vehicle, and supplying electric power to the MG so as to drive the vehicle 100.

The MG heat exchanger 36 is configured to exchange heat with the MG (not shown) of the vehicle 100. Specifically, the MG heat exchanger 36 is configured so as to exchange heat between oil and cooling water flowing around the MG. Further, the PCU heat exchanger 37 is configured to exchange heat with the PCU (not shown) of the vehicle 100. Specifically, the PCU heat exchanger 37 is provided with piping provided around the PCU and is configured so that heat is exchanged between the cooling water flowing through this piping and the battery. The MG is used for driving the vehicle 100 by the electric power supplied from the battery and for generating electric power to supply the electric power to the battery. Further, the PCU is used for controlling the battery and MG.

Next, the high temperature circuit 4 will be explained. The high temperature circuit 4 is provided with a second pump 41, cooling water piping 22b of the condenser 22, high temperature radiator 42, heater core 43, third three-way valve 44, third solenoid regulating valve 45, fourth solenoid regulating valve 46 and engine cooling circuit 5. In the high temperature circuit 4 as well, the cooling water is circulated through these components. Note that, this cooling water is one example of the second heat medium circulating in the high temperature circuit 4. In the high temperature circuit 4, any other heat medium may be used instead of cooling water.

Further, the high temperature circuit 4 is divided into a high temperature basic flow path 4a, high temperature radiator flow path 4b, heater flow path 4c, engine inflow flow path 4d, engine outflow flow path 4e, core upstream side communication path 4f, core downstream side communication path 4g and engine cooling circuit 5. The high temperature radiator flow path 4b and heater flow path 4c are provided in parallel with each other and are respectively connected to the high temperature basic flow path 4a. Note that, in this Description, the part of the high temperature circuit 4 positioned downstream of the condenser 22 and upstream of the heater core 43 in the direction of circulation of the cooling water (part of high temperature basic flow path 4a and heater flow path 4c) will be called the "core upstream side part". Further, the part of the high temperature circuit 4 positioned downstream of the heater core 43 and upstream of the condenser 22 in the direction of circulation of the cooling water (remaining part of high temperature basic flow path 4a and heater flow path 4c) will be called the "core downstream side part".

The engine inflow flow path 4d is communicated with the heater flow path 4c at the downstream side of the heater core 43 in the direction of circulation of the cooling water and the engine cooling circuit 5. In particular, the engine inflow flow path 4d is communicated with the engine cooling circuit 5 at the inlet side of the cooling water flow path of the internal combustion engine 52 in the direction of circulation of the cooling water of the engine cooling circuit 5. As a result, the high temperature circuit 4 is configured so that the inlet of the cooling water flow path of the internal combustion engine 52 provided at the engine cooling circuit 5 is communicated with the core downstream side part by the engine inflow flow path 4d.

The engine outflow flow path 4e communicates with the engine cooling circuit 5 at one end part and communicates with the core upstream side communication path 4f and core downstream side communication path 4g at the other end part. In particular, the engine outflow flow path 4e communicates with the engine cooling circuit 5 at the outlet side of the cooling water flow path of the internal combustion engine 52 in the direction of circulation of the cooling water in the engine cooling circuit 5. Further, the core upstream side communication path 4f communicates with the heater flow path 4c at the upstream side of the heater core 43 in the direction of circulation of the cooling water. On the other hand, the core downstream side communication path 4g communicates with the heater flow path 4c at the downstream side of the heater core 43 in the direction of circulation of the cooling water. As a result, the high temperature circuit 4 is configured so that the outlet of the cooling water flow path of the internal combustion engine 52 separately communicates with the core upstream side part and core downstream side part.

The high temperature basic flow path 4a is provided with a second pump 41 and cooling water piping 22b of the condenser 22 in that order in the direction of circulation of the cooling water. The high temperature radiator flow path 4b is provided with a third solenoid regulating valve 45 and high temperature radiator 42 in that order in the direction of circulation of the cooling water. Further, the heater flow path 4c is provided with a fourth solenoid regulating valve 46 and heater core 43 in that order in the direction of circulation of the cooling water. Note that, the heater flow path 4c may also be provided with an electric heater at the upstream side of the heater core 43 in the direction of circulation of the cooling water. The third three-way valve 44 is provided between the engine outflow flow path 4e and the core upstream side communication path 4f and core downstream side communication path 4g.

The second pump 41 pumps the cooling water circulating through the high temperature circuit 4. In the present embodiment, the second pump 41 is an electrically powered water pump in the same way as the first pump 31. Further, the high temperature radiator 42, in the same way as the low temperature radiator 32, is a heat exchanger exchanging heat between the cooling water circulating through the high temperature circuit 4 and the outside air.

The heater core 43 is configured to exchange heat between the cooling water circulating through the high temperature circuit 4 and the air around the heater core 43 to warm the air around the heater core 43, and as a result heat the inside of the passenger compartment. Specifically, the heater core 43 is configured to discharge the heat from the cooling water to the air around the heater core 43. Therefore, if high temperature cooling water flows to the heater core 43, the temperature of the cooling water decreases and the air around the heater core 43 is warmed.

The third three-way valve 44 functions as a first circulation mode control device able to switch between a first state in which the engine outflow flow path 4e communicates with the core upstream side communication path 4f and a second state in which the engine outflow flow path 4e communicates with the core downstream side communication path 4g. If the third three-way valve 44 is set to the first state, the cooling water flowing out from the cooling water flow path of the internal combustion engine 52 flows through the core upstream side communication path 4f to the heater flow path 4c at the upstream side of the heater core 43. On the other hand, if the third three-way valve 44 is set to the second state, the cooling water flowing out from the cooling water flow path of the internal combustion engine 52 flows through the core downstream side communication path 4g and flows into the heater flow path 4c at the downstream side of the heater core 43. Note that, if possible to suitably adjust the flow rate of the cooling water flowing from the engine outflow flow path 4e to the core upstream side communication path 4f and core downstream side communication path 4g, it is also possible to use a regulating valve or on-off valve or other circulation mode control device instead of the third three-way valve 44. Further, the third three-way valve 44 may be configured to be set to states other than the first and second states, such as a state where all of the engine outflow path 4e, core upstream side communication path 4f and core downstream side communication path 4g do not communicate with each other.

The third solenoid regulating valve 45 and fourth solenoid regulating valve 46 are used as the second circulation mode control device for controlling the mode of circulation of cooling water in the high temperature circuit 4, in particular for controlling the mode of circulation of cooling water from the cooling water piping 22b of the condenser 22 to the high temperature radiator 42 and heater core 43 (and a cooling water path of the internal combustion engine). The larger the opening degree of the third solenoid regulating valve 45, the greater the cooling water flowing into the high temperature radiator flow path 4b and accordingly the greater the cooling water flowing into the high temperature radiator 42. Further, the greater the opening degree of the fourth solenoid regulating valve 46, the greater the cooling water flowing into the heater flow path 4c and accordingly the greater the cooling water flowing into the heater core 43. Therefore, the third solenoid regulating valve 45 and fourth solenoid regulating valve 46 can control the ratio of cooling water, flowing out from the cooling water piping 22b of the condenser 22, flowing into the high temperature radiator path 4b and heater path 4c.

Note that, in the present embodiment, the solenoid regulating valves 45 and 46 are configured as valves able to be adjusted in opening degrees, but may also be on-off valves switched between the opened state and the closed state. Further, instead of the third solenoid regulating valve 45 and fourth solenoid regulating valve 46, a three-way valve able to make the cooling water from the high temperature basic flow path 4a selectively flow to only the high temperature radiator flow path 4b, only the heater flow path 4c, and/or both may be provided. Therefore, if possible to adjust the flow rate from the high temperature basic flow path 4a to the high temperature radiator flow path 4b and heater flow path 4c, any sort of valves may be provided as second circulation mode control devices instead of these solenoid regulating valves 45 and 46.

Next, the engine cooling circuit 5 will be explained. The engine cooling circuit 5 is provided with a third pump 51, cooling water flow path of the internal combustion engine 52, engine radiator 53, and thermostat 54. In the engine cooling circuit 5, cooling water is circulated through these components. Note that, this cooling water is one example of the first heat medium. In the engine cooling circuit 5, any other heat medium may be used if this heat medium is a heat medium the same as the high temperature circuit 4.

Further, the engine cooling circuit 5 is divided into an engine basic flow path 5a, engine radiator flow path 5b, and bypass flow path 5c. The engine radiator flow path 5b and the bypass flow path 5c are provided in parallel with each other, and are respectively connected to the engine basic flow path 5a.

The engine basic flow path 5a is provided with a third pump 51 and a cooling water flow path of the internal combustion engine 52 in that order in the direction of circulation of the cooling water. The engine radiator flow path 5b is provided with an engine radiator 53. Further, the engine inflow flow path 4d and engine outflow flow path 4e communicate with the bypass flow path 5c. In particular, the engine inflow flow path 4d is communicated with the downstream side part of the bypass flow path 5c. As a result, the engine inflow flow path 4d communicates with the vicinity of the inlet of the cooling water flow path of the internal combustion engine 52. On the other hand, the engine outflow flow path 4e communicates with the upstream side part of the bypass flow path 5c. As a result, the engine inflow flow path 4d communicates with the vicinity of the outlet of the cooling water flow path of the internal combustion engine 52. Therefore, the cooling water flow path of the internal combustion engine 52 is configured to communicate with the high temperature circuit 4 so that the cooling water of the high temperature circuit 4 circulates through it. Between the engine basic flow path 5a and the engine radiator flow path 5b and bypass flow path 5c, a thermostat 54 is provided. Note that the engine inflow path 4d may communicate with a path other than the bypass path 5c, such as the engine basic flow path 5a, as long as it communicates with a vicinity of the inlet of the cooling water path of the internal combustion engine 52. Similarly, the engine outflow path 4e may communicate with a path other than the bypass path 5c, such as the engine basic path 5a, as long as it communicates with a vicinity of the outlet of the cooling water path of the internal combustion engine.

The third pump 51 pumps cooling water circulating through the engine cooling circuit 5. In the present embodiment, the third pump 51 is an electrically powered water pump which is the same type as the first pump 31. Further, the engine radiator 53 is, similarly to the low temperature radiator 32, a heat exchanger exchanging heat between the cooling water circulating through the engine cooling circuit 5 and the outside air.

The internal combustion engine 52 is configured so that when supplied with fuel, it burns the supplied fuel and generates kinetic energy. The internal combustion engine 52 becomes high in temperature along with burning of the fuel, and makes cooling water circulate through the cooling water flow path of the internal combustion engine to thereby keep the internal combustion engine 52 from excessively rising in temperature.

The thermostat 54 is a valve which is switched between a closed state which cuts off the flow of cooling water flowing through the engine radiator flow path 5b and an opened state which permits the flow of cooling water through the engine radiator flow path 5b. The thermostat 54 is opened to enable cooling water to flow to the engine radiator flow path 5b when the temperature of the cooling water circulating through the bypass flow path 5c is equal to or greater than a predetermined temperature. On the other hand, the thermostat 54 is closed so that cooling water does not flow to the engine radiator flow path 5b when the temperature of the cooling water circulating through the bypass flow path 5c is less than the predetermined temperature. As a result, the temperature of the cooling water circulating through the internal combustion engine 52 is held substantially constant.

FIG. 2 is a view of the configuration schematically showing the air passage 7 for air-conditioning the vehicle 100 mounting the vehicle-mounted temperature controller 1. In the air passage 7, air flows in the direction shown by the arrow marks in the figure. The air passage 7 shown in FIG. 2 is connected to the outside of the vehicle 100 or the air intake openings of the passenger compartment. The outside air or the air inside the passenger compartment flows into the air passage 7, according to the state of control by the control device 6. Further, the air passage 7 shown in FIG. 2 is connected to a plurality of air vent openings blowing air into the passenger compartment. Air is supplied from the air passage 7 to any of the air vent openings according to the state of control by the control device 6.

As shown in FIG. 2, at the air passage 7 for air-conditioning of the present embodiment, a blower 71, evaporator 26, air mix door 72, and heater core 43 are provided in that order in the direction of flow of the air.

The blower 71 is provided with a blower motor 71a and a blower fan 71b. The blower 71 is configured so that if the blower fan 71b is driven by the blower motor 71a, the outside air or the air inside the passenger compartment flows into the air passage 7 and the air flows through the air passage 7.

The air mix door 72 adjusts the flow rate of the air flowing through the heater core 43 in the air flowing through the air passage 7. The air mix door 72 is configured to be able to be adjusted among the state where all of the air flowing through the air passage 7 flows through the heater core 43, the state where none of the air flowing through the air passage 7 flows through the heater core 43, and states between them.

In the thus configured air passage 7, when the blower 71 is driven, if the refrigerant circulates through the evaporator 26, the air flowing through the air passage 7 is cooled. Further, when the blower 71 is driven, if the cooling water circulates to the heater core 43 and the air mix door 72 is controlled so that air flows through the heater core 43, the air flowing through the air passage 7 is warmed.

FIG. 3 is a view schematically showing the vehicle 100 mounting the vehicle-mounted temperature controller 1. As shown in FIG. 3, at the inside of the front grille of the vehicle 100, a low temperature radiator 32, high temperature radiator 42 and engine radiator 53 are arranged. Therefore, when the vehicle 100 is flowing, wind generated based on movement of vehicle strikes these radiators 32, 42 and 53. Further, a fan 76 is provided adjacent to these radiators 32, 42 and 53. The fan 76 is configured so that if driven, the air strikes the radiators 32, 42 and 53. Therefore, even when the vehicle 100 is not flowing, by driving the fan 76, it is possible to make air strike the radiators 32, 42 and 53.

Referring to FIG. 1, the control device 6 is provided with an electronic control unit (ECU) 61. The ECU 61 is provided with a processor for performing various types of processing, a memory storing programs and various types of information, and an interface connected with various actuators and various sensors.

Further, the control device 6 is provided with a battery temperature sensor 62 detecting the temperature of the battery, a first water temperature sensor 63 detecting the temperature of the cooling water flowing out from the chiller 27, a second water temperature sensor 64 detecting the temperature of the cooling water flowing into the condenser 22, and a third temperature sensor 66 for detecting the temperature of the cooling water flowing into the cooling water path of the internal combustion engine 52. The ECU 61 is connected to these sensors, and output signals from these sensors are input to the ECU 61.

In addition, the ECU 61 is connected to various types of actuators of the vehicle-mounted temperature controller 1 and controls these actuators. Specifically, the ECU 61 is connected to the compressor 21, the solenoid regulating valves 28, 29, 45 and 46, the pumps 31, 41 and 51, the three-way valves 33, 34, and 43, the electric heater 44, the blower motor 71a, the air mix door 72, and the fan 76 and controls the same.

Operation of Vehicle-Mounted Temperature Controller

Next, referring to FIGS. 4 to 12, typical operating states of the vehicle-mounted temperature controller 1 will be explained. In FIGS. 4 to 12, a flow path through which the refrigerant or the cooling water flows is shown by a solid line, while a flow path through which the refrigerant or cooling water does not flow is shown by a broken line. Further, thin arrow marks in the figures show flow directions of refrigerant or cooling water, and thick arrow marks in the figures show directions of movement of heat.

Figure 4:
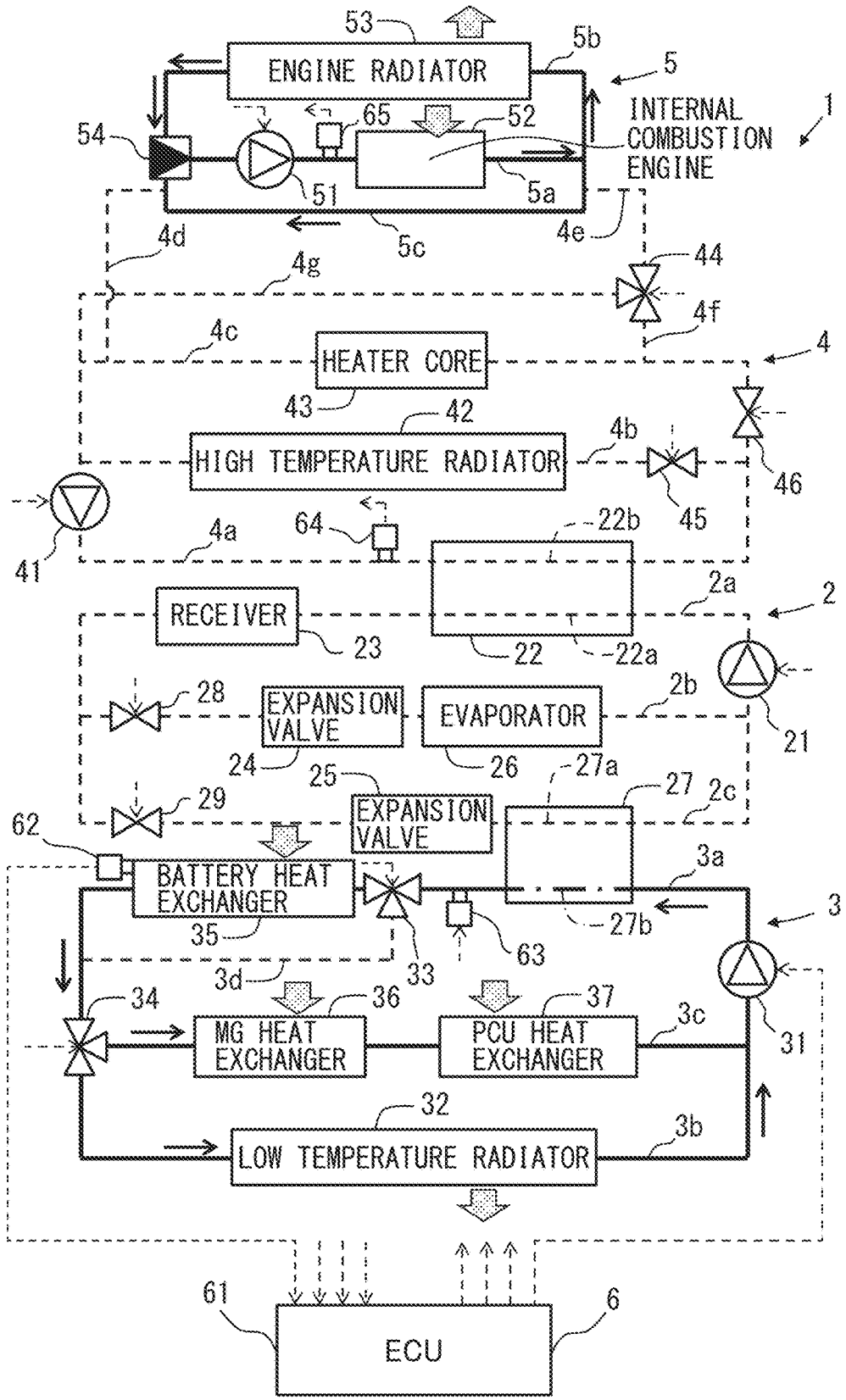
FIG. 4 shows an operating state of the vehicle-mounted temperature controller in the case where neither cooling nor heating of the passenger compartment is demanded and cooling of a battery or other heat generating device is necessary (first stopping mode).

FIG. 4 shows the operating state of the vehicle-mounted temperature controller 1 in the case where neither cooling nor heating of the passenger compartment is demanded and cooling of a heat generating device such as the battery is required (first stopping mode). In particular, the internal combustion engine 52 is stopped in the first stopping mode.

As shown in FIG. 4, in the first stopping mode, the compressor 21 and the second pump 41 are stopped from operating. Therefore, in the refrigeration circuit 2, no refrigerant circulates. Further, in the high temperature circuit 4, no cooling water circulates. On the other hand, in the first stopping mode, the first pump 31 is driven. Therefore, cooling water circulates in the low temperature circuit 3.

Further, in the first stopping mode, the first three-way valve 33 is set so that cooling water circulates through the battery heat exchanger 35. Further, in the example shown in FIG. 4, the second three-way valve 34 is set so that the cooling water flows to both of the low temperature radiator flow path 3b and heat generating device flow path 3c.

As a result, in the first stopping mode, in the battery heat exchanger 35, MG heat exchanger 36 and PCU heat exchanger 37 (hereinafter, these are referred to as "heat exchanger of heat generating device"), the heat of the battery, MG and PCU (heat generating device) is transferred to the cooling water. For this reason, the heat generating device is cooled and the temperature of the cooling water rises to equal to or greater than the temperature of the outside air. After that, the cooling water is cooled at the low temperature radiator 32 by heat exchange with the outside air, and again flows into the heat exchangers of heat generating device. Therefore, in the first stopping mode, heat is absorbed from the heat generating device at the heat exchanger of heat generating device and that heat is discharged at the low temperature radiator 32.

Figure 5:
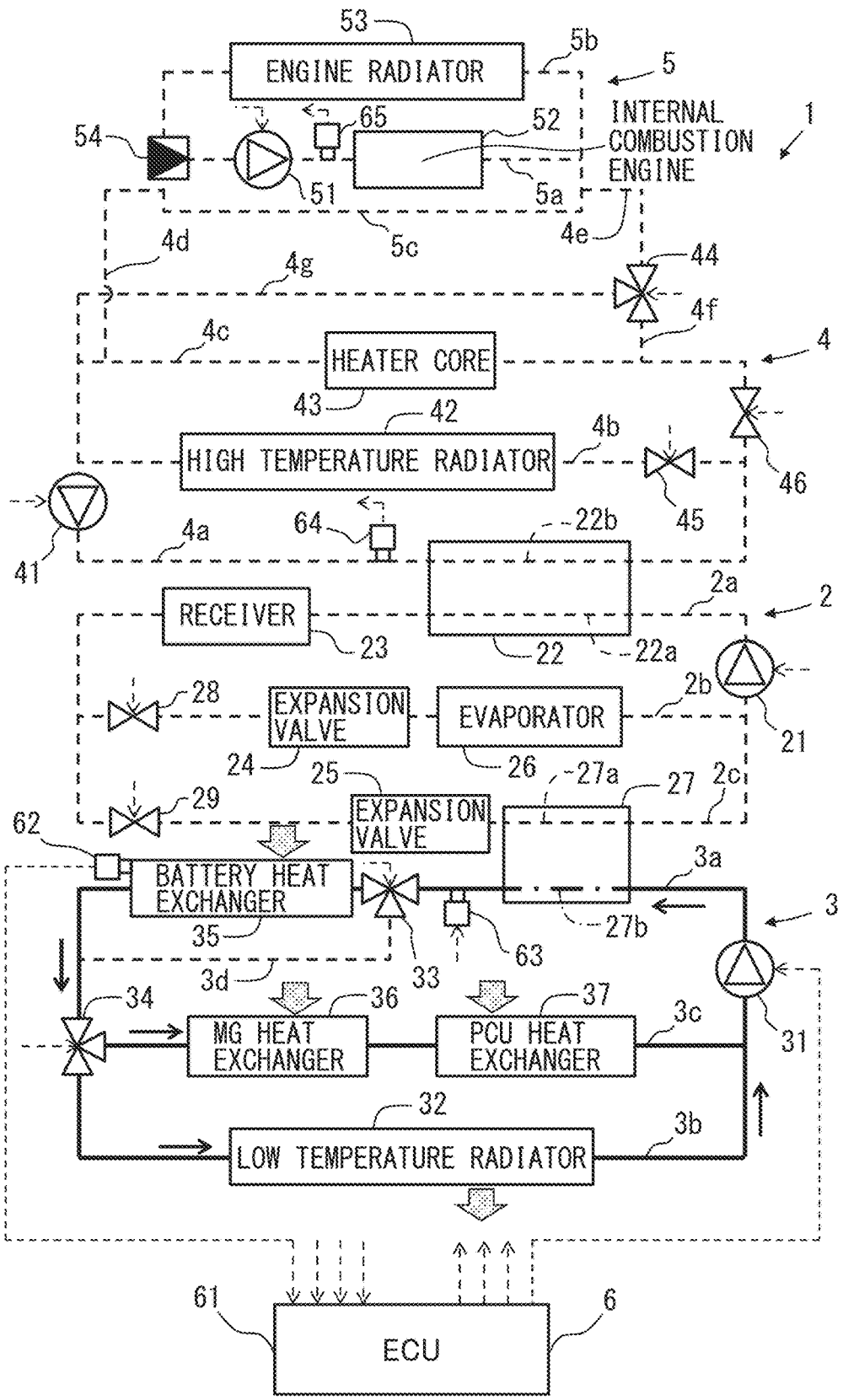
FIG. 5 shows an operating state of the vehicle-mounted temperature controller in the case whether neither cooling nor heating of the vehicle compartment is demanded and cooling of a heat generating device is necessary (first stopping mode).

Note that, in the example shown in FIG. 4, at this time, the internal combustion engine 52 is operating. For this reason, the third pump 51 is driven, and cooling water is circulated in the engine cooling circuit 5. If the temperature of the cooling water in the engine cooling circuit 5 is high, the thermostat 54 opens and cooling water is circulated to the engine radiator 53 as well. On the other hand, when the internal combustion engine 52 is stopped in the state where it has been warmed up, as shown in FIG. 5, the operation of the third pump 51 is stopped and accordingly cooling water is not circulated in the engine cooling circuit 5.

Figure 6:
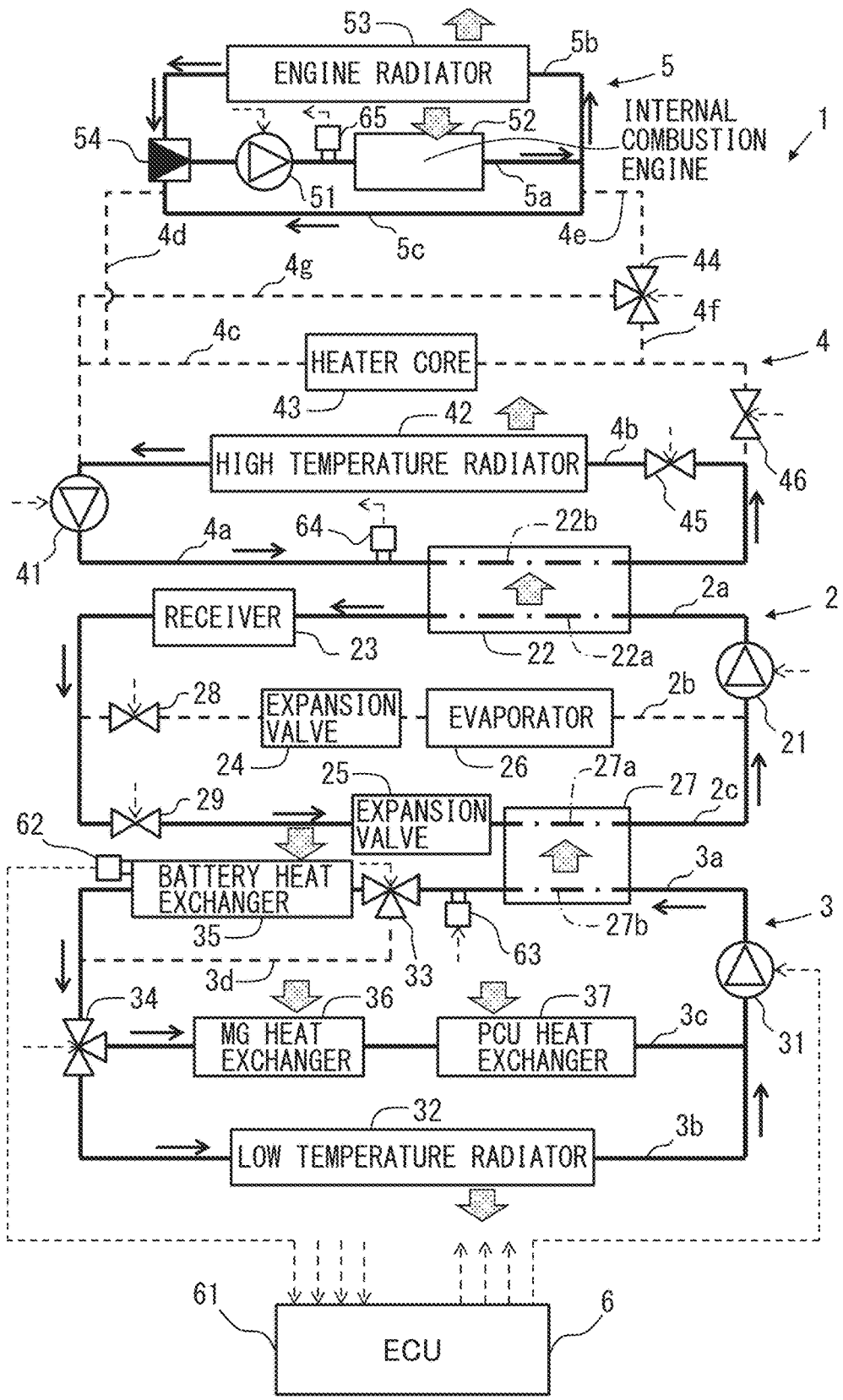
FIG. 6 shows an operating state of the vehicle-mounted temperature controller in the case whether neither cooling nor heating of the vehicle compartment is demanded and strong cooling of a heat generating device is necessary (second stopping mode).

FIG. 6 shows the operating state of the vehicle-mounted temperature controller 1 in the case where neither cooling nor heating of the passenger compartment is demanded and strong cooling of a heat generating device is required (second stopping mode).

As shown in FIG. 6, in the second stopping mode, all of the compressor 21, first pump 31, and second pump 41 are operated. Therefore, the refrigerant or cooling water is circulated in all of the refrigeration circuit 2, low temperature circuit 3, and high temperature circuit 4.

Further, in the second stopping mode, the first solenoid regulating valve 28 is closed and the second solenoid regulating valve 29 is opened. Therefore, refrigerant does not flow through the evaporator 26, while refrigerant flows through the chiller 27. In addition, in the second stopping mode, the first three-way valve 33 is set so that the cooling water flows through the battery heat exchanger 35. Further, in the example shown in FIG. 6, the second three-way valve 34 is set so that the cooling water flows to both of the low temperature radiator flow path 3b and heat generating device flow path 3c. By doing this, cooling water also flows to the MG heat exchanger 36 and the PCU heat exchanger 37, therefore the MG and the PCU can be cooled. Further, in the second stopping mode, the third solenoid regulating valve 45 is opened and the fourth solenoid regulating valve 46 is closed. Therefore, the cooling water in the high temperature circuit 4 flows through the condenser 22, then flows into the high temperature radiator flow path 4b.

As a result, in the second stopping mode, the heat of the cooling water in the low temperature circuit 3 is transferred to the refrigerant at the chiller 27, whereby the cooling water is cooled. After that, this low temperature cooling water flows to the battery heat exchanger 35 or other heat exchanger of a heat generating device, whereby the heat generating device is cooled. On the other hand, heat of the refrigerant is transferred at the condenser 22 to the high temperature circuit 4, whereby the cooling water in the high temperature circuit 4 is warmed. After that, this high temperature cooling water is cooled at the high temperature radiator 42 by heat exchange with the outside air and again flows into the condenser 22. Therefore, in the second stopping mode, heat is absorbed from the heat generating device at the heat exchanger of the heat generating device and that heat is discharged at the high temperature radiator 42.

Figure 7:
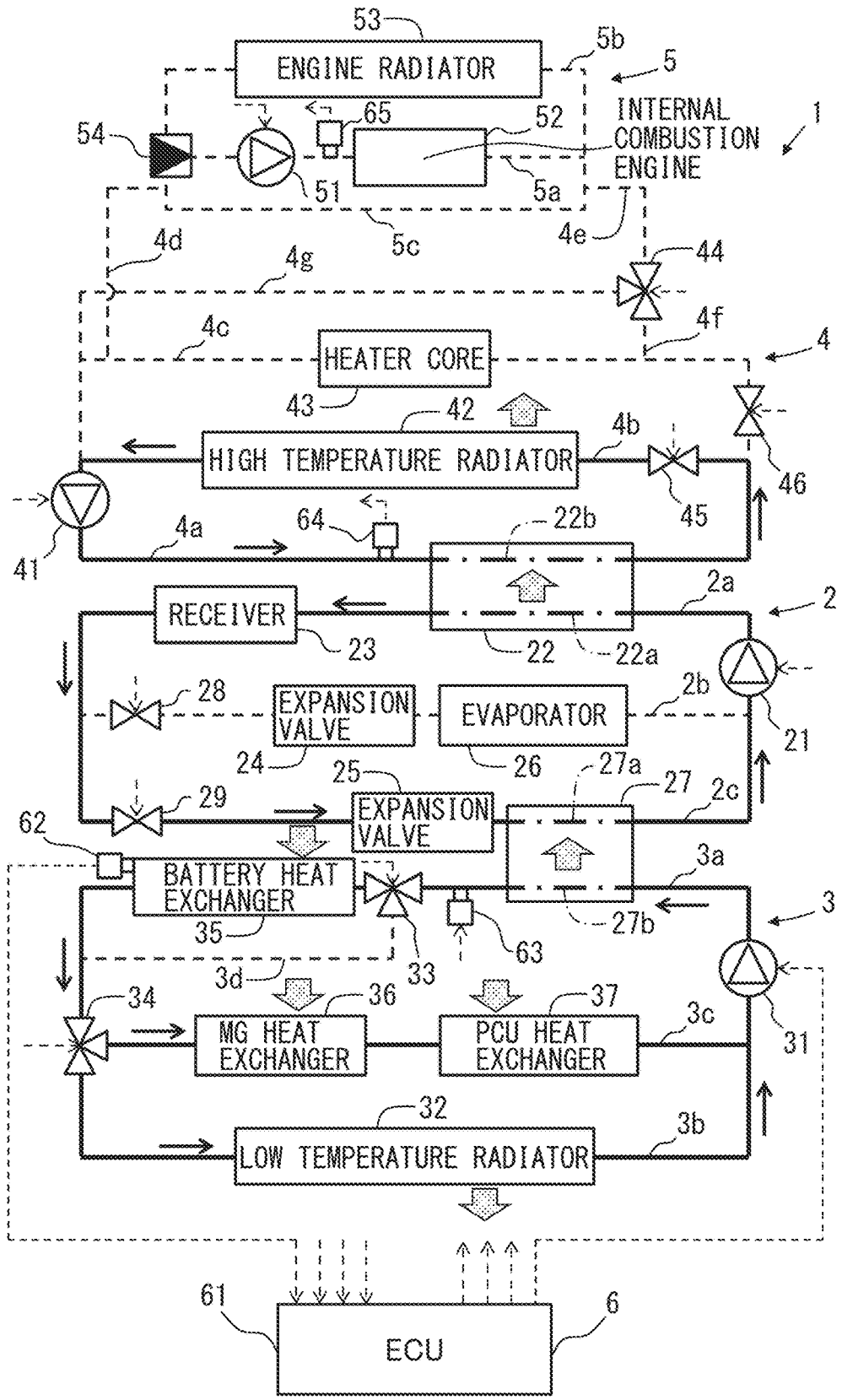
FIG. 7 shows an operating state of the vehicle-mounted temperature controller in the case whether neither cooling nor heating of the vehicle compartment is demanded and strong cooling of a heat generating device is necessary (second stopping mode).

Note that, in the example shown in FIG. 6, the internal combustion engine 52 is operated. Therefore, the third pump 51 is driven and cooling water circulates in the engine cooling circuit 5. On the other hand, when the internal combustion engine 52 is stopped in the state completely warmed up, as shown in FIG. 7, the operation of the third pump 51 is stopped and accordingly cooling water does not circulate in the engine cooling circuit 5.

Figure 8:
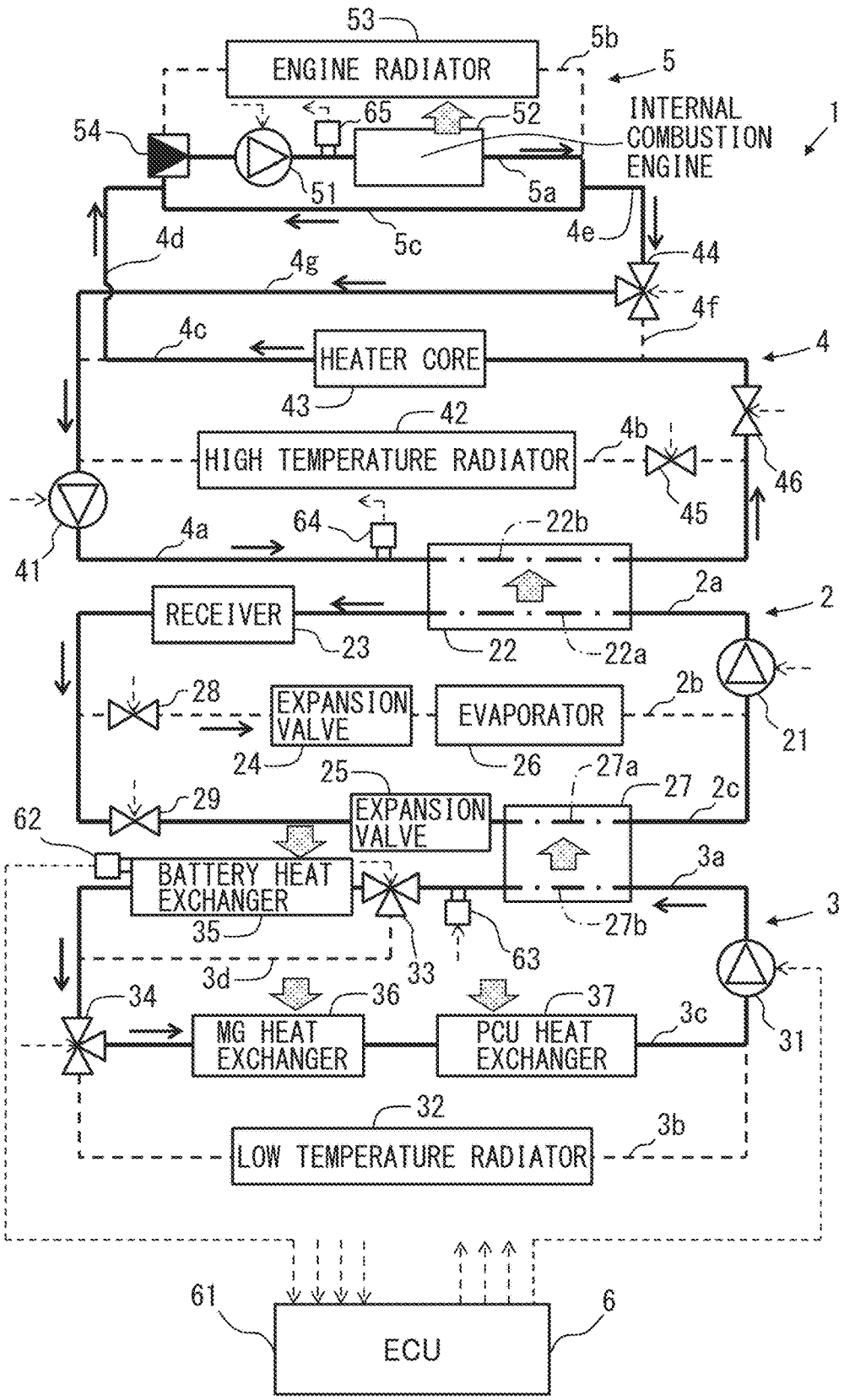
FIG. 8 shows an operating state of the vehicle-mounted temperature controller in the case of raising the temperature of cooling water flowing into the internal combustion engine while the internal combustion engine is stopped (warmup mode).

FIG. 8 shows an operating state of the vehicle-mounted temperature controller 1 in the case whether neither cooling nor heating of the vehicle compartment are demanded and the temperature of cooling water flowing into the internal combustion engine 52 should be raised while the internal combustion engine is stopped (warmup mode). In particular, in the present embodiment, the warmup mode is performed in the case where the internal combustion engine 52 is stopped and the vehicle 100 is being driven by the MG.

As shown in FIG. 8, in the warmup mode, the compressor 21, first pump 31, second pump 41, and third pump 51 are all operated. Further, in the warmup mode, the first solenoid regulating valve 28 is closed and the second solenoid regulating valve 29 is opened. Therefore, refrigerant does not flow through the evaporator 26, but refrigerant flows through the chiller 27. In addition, in the warmup mode, the first three-way valve 33 is set so that cooling water flows through the battery heat exchanger 35. Further, in the example shown in FIG. 8, the second three-way valve 34 is set so that the cooling water flows to only the heat generating device flow path 3c.

Furthermore, in the warmup mode, the third solenoid regulating valve 45 is closed and the fourth solenoid regulating valve 46 is opened. Therefore, the cooling water in the high temperature circuit 4 flows through the condenser 22, then flows into the heater flow path 4c.

As a result, in the warmup mode, at the heat exchanger, such as the battery heat exchanger 35, MG heat exchanger 36, PCU heat exchanger 37, heat is discharged from the heat generating device to the cooling water in the low temperature circuit 3. For this reason, the heat generating device is cooled and the cooling water is raised in temperature. Further, in the warmup mode, the heat of the cooling water in the low temperature circuit 3 is transferred to the refrigerant at the chiller 27, whereby this cooling water is cooled and the refrigerant is raised in temperature. The cooling water cooled by the chiller 27 is again supplied to the heat exchanger of the heat generating device.

Further, in the warmup mode, the heat of the refrigerant is transferred to the cooling water of the high temperature circuit 4 at the condenser 22, whereby this refrigerant is cooled and the cooling water in the high temperature circuit 4 is raised in temperature. The refrigerant cooled at the condenser 22 is again supplied to the chiller 27.

In the warmup mode, the third pump 51 of the engine cooling circuit 5 is driven and the third three-way valve 44 is set to the second state. Therefore, the engine outflow flow path 4e is communicated with the core downstream side communication path 4g. As a result, part of the cooling water flowing out from the condenser 22 and flowing through the heater core 43 flows through the engine inflow flow path 4d into the engine cooling circuit 5. Therefore, the cooling water raised in temperature at the condenser 22 flows into the cooling water passage of the internal combustion engine 52. In other words, in the heating mode, the third three-way valve 44, third solenoid regulating valve 45, and fourth solenoid regulating valve 46 are controlled so that the cooling water in the high temperature circuit 4 raised in temperature by absorbing heat from the refrigerant at the condenser 22 flows into the cooling water flow path of the internal combustion engine 52. As a result, warmup of the internal combustion engine 52 is promoted. The cooling water robbed of heat at the cooling water flow path of the internal combustion engine 52 flows out from the cooling water flow path of the internal combustion engine 52, then flows through the engine outflow flow path 4e and the core downstream side communication path 4g to be again supplied to the cooling water piping 22b of the condenser 22 and raised in temperature.

Therefore, in the warmup mode, heat is absorbed at the heat generating device. Due to that heat, the cooling water flowing into the cooling water flow path of the internal combustion engine 52 is raised in temperature. Accordingly, the internal combustion engine 52 is warmed up.

Note that, in the warmup mode, the second three-way valve 34 may be set so that if the temperature of the heat generating device falls, the cooling water flows to both of the low temperature radiator flow path 3b and heat generating device flow path 3c. Further, in the warmup mode, the first three-way valve 33 may be set so that if the temperature of the battery falls, the cooling water flows into the bypass flow path 3d.

Figure 9:
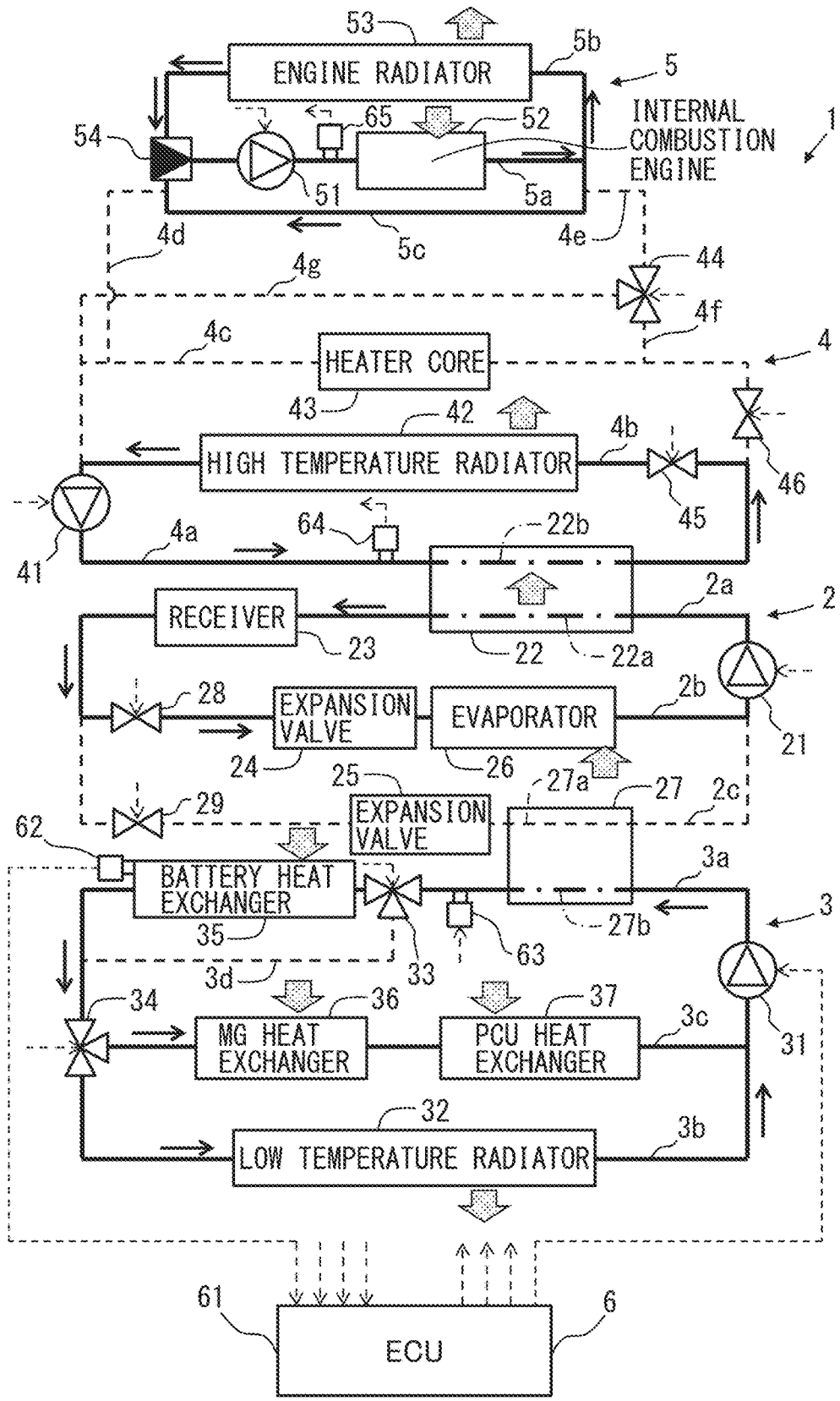
FIG. 9 shows an operating state of the vehicle-mounted temperature controller in the case where cooling of the passenger compartment is demanded and cooling of a heat generating device is necessary (first cooling mode).

FIG. 9 shows the operating state of the vehicle-mounted temperature controller 1 in the case where cooling of the vehicle compartment is demanded and cooling of a heat generating device is necessary (first cooling mode). Further, in the example shown in FIG. 9, the internal combustion engine 52 is operating.

As shown in FIG. 9, in the first cooling mode, the compressor 21, first pump 31, and second pump 41 are all being operated. Further, in the first cooling mode, the first solenoid regulating valve 28 is opened and the second solenoid regulating valve 29 is closed and, further, the third solenoid regulating valve 45 is opened and the fourth solenoid regulating valve 46 is closed. Further, in the example shown in FIG. 9, the second three-way valve 34 is set so that the cooling water flows to both of the low temperature radiator flow path 3b and heat generating device flow path 3c.

As a result, in the first cooling mode, the heat of the surrounding air is transferred to the refrigerant at the evaporator 26, whereby the surrounding air is cooled. On the other hand, the heat of the refrigerant is transferred to the high temperature circuit 4 at the condenser 22, whereupon the cooling water in the high temperature circuit 4 is warmed. After that, this high temperature cooling water is cooled by exchange of heat with the outside air at the high temperature radiator 42, and again flows into the condenser 22.

Further, in the first cooling mode, heat of a heat generating device is transferred to the cooling water at the heater exchanger of the heat generating device. After that, the cooling water is cooled by exchange of heat with the outside air at the low temperature radiator 32, and again flows into the battery heat exchanger 35. Therefore, in the first cooling mode, heat is absorbed from the surrounding air at the evaporator 26, that heat is discharged at the high temperature radiator 42, the heat is absorbed from the heat generating device at the heat exchanger of the heat generating device, and that heat is discharged at the low temperature radiator 32.

Figure 10:
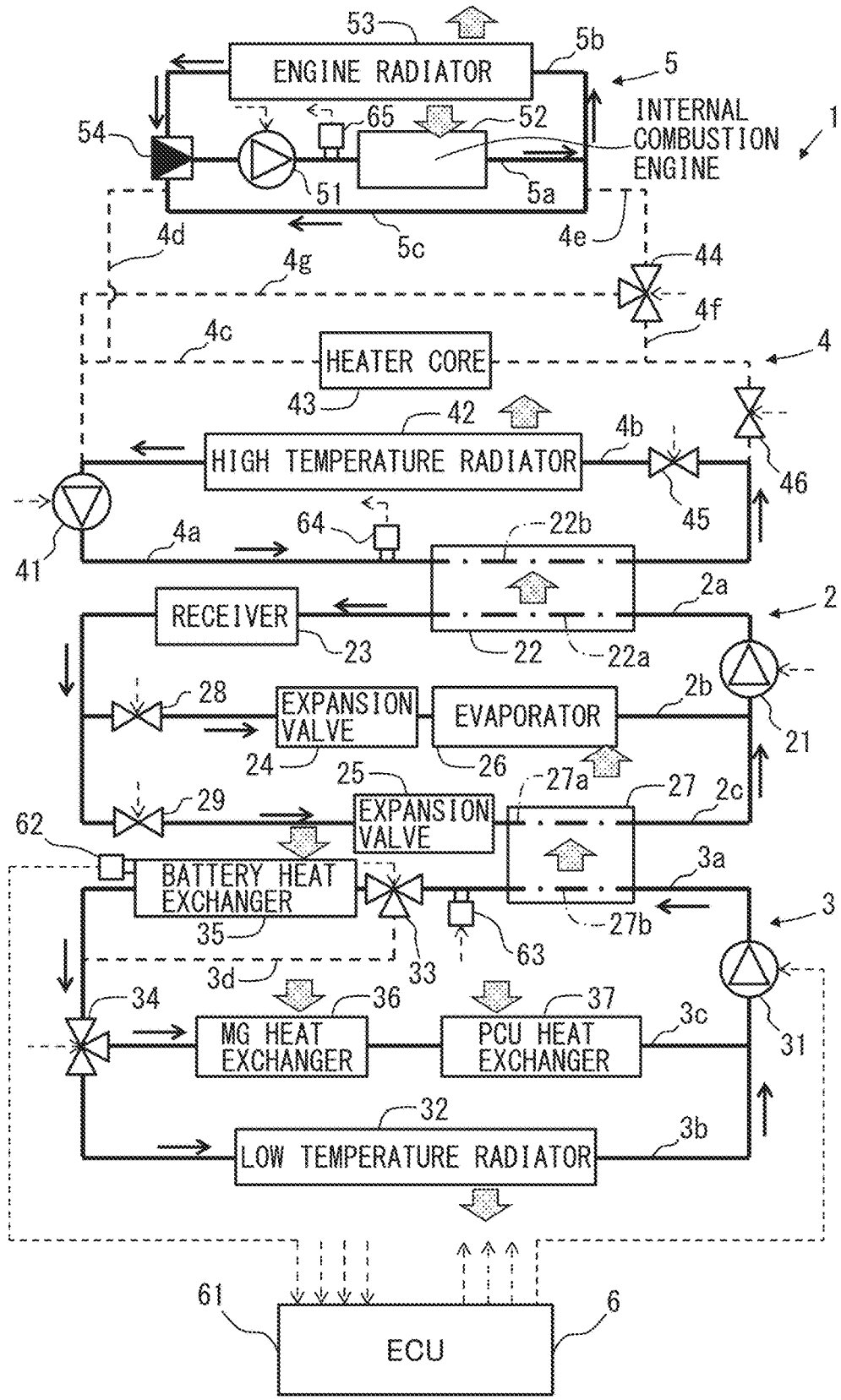
FIG. 10 shows an operating state of the vehicle-mounted temperature controller in the case where cooling of the passenger compartment is demanded and strong cooling of a heat generating device is necessary (second cooling mode).

FIG. 10 shows the operating state of the vehicle-mounted temperature controller 1 in the case where cooling of the vehicle compartment is demanded and strong cooling of a heat generating device is necessary (second cooling mode).

As shown in FIG. 10, in the second cooling mode, the compressor 21, first pump 31, and second pump 41 are all operated. Further, in the second cooling mode, the first solenoid regulating valve 28 and the second solenoid regulating valve 29 are both opened. Accordingly, refrigerant flows through both of the evaporator 26 and the chiller 27. At this time, the opening degrees of the solenoid regulating valves 28 and 29 are adjusted in accordance with the cooling strength, battery temperature, etc. In addition, in the second cooling mode, the first three-way valve 33 is set so that the cooling water flows through the battery heat exchanger 35. Further, in the example shown in FIG. 10, the second three-way valve 34 is set so that the cooling water flows to both of the low temperature radiator flow path 3*b* and heat generating device flow path 3*c*. Furthermore, in the second cooling mode, the third solenoid regulating valve 45 is opened, while the fourth solenoid regulating valve 46 is closed.

As a result, in the second cooling mode, the heat of the cooling water in the low temperature circuit 3 is transferred to the refrigerant at the chiller 27, whereby this cooling water is cooled. After that, this low temperature cooling water flows to the heat exchanger of the heat generating device, whereby the heat generating device is cooled. Further, in the second cooling mode, heat of the surrounding air is transferred to the refrigerant at the evaporator 26, whereby the surrounding air is cooled. On the other hand, the heat of the refrigerant is transferred to the high temperature circuit 4 at the condenser 22, whereby the cooling water in the high temperature circuit 4 is warmed. After that, this high temperature cooling water is cooled by heat exchange with the outside air at the high temperature radiator 42 and again flows into the condenser 22. Therefore, in the second cooling mode, heat is absorbed from the heat generating device at the heat exchanger of the heat generating device, heat is absorbed from the surrounding air at the evaporator 26, and that heat is discharged at the high temperature radiator 42.

Figure 11:
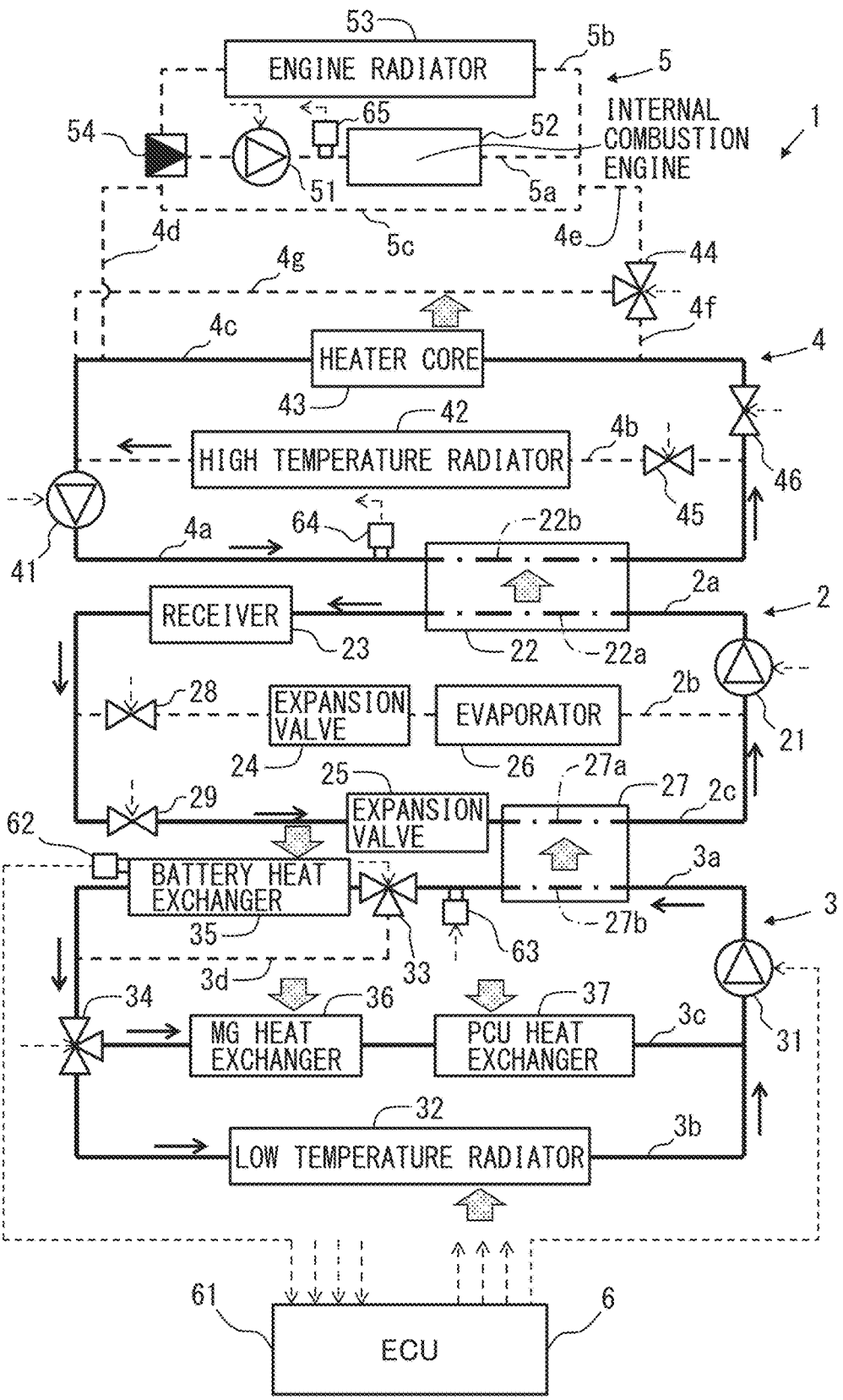
FIG. 11 shows an operating state of the vehicle-mounted temperature controller in the case where heating of the passenger compartment is demanded and the internal combustion engine is stopped (first heating mode).

FIG. 11 shows an operating state of the vehicle-mounted temperature controller 1 in the case where heating of the vehicle compartment is demanded and the internal combustion engine is stopped (first heating mode).

As shown in FIG. 11, in the first heating mode, the compressor 21, first pump 31, and second pump 41 are all operated. Further, in the first heating mode, the first solenoid regulating valve 28 is closed and the second solenoid regulating valve 29 is opened. Therefore, refrigerant does not flow through the evaporator 26, while refrigerant flows through the chiller 27. In addition, in the first heating mode, the first three-way valve 33 is set so that the cooling water flows through the battery heat exchanger 35. Further, in the example shown in FIG. 11, the second three-way valve 34 is set so that the cooling water flows to both of the low temperature radiator flow path 3*b* and heat generating device flow path 3*c*. Note that, the first three-way valve 33 may also be set so that the cooling water flows through the bypass flow path 3*d*. Further, the second three-way valve 34 may be set so that the cooling water flows to only the low temperature radiator flow path 3*b*.

Furthermore, in the first heating mode, the third solenoid regulating valve 45 is closed, while the fourth solenoid regulating valve 46 is opened. Therefore, the cooling water in the high temperature circuit 4 flows through the condenser 22, then flows into the heater flow path 4*c*. Further, the internal combustion engine 52 is stopped and accordingly the third pump 51 is also stopped. For this reason, the cooling water does not flow through the engine inflow flow path 4*d* or the engine outflow flow path 4*e*.

As a result, in the first heating mode, heat of the cooling water in the low temperature circuit 3 is transferred to the refrigerant at the chiller 27, whereby this cooling water is cooled. As shown in FIG. 11, if the first three-way valve 33 is set so that cooling water flows through the battery heat exchanger 35 or the heat generating device flow path 3*c*, this low temperature cooling water flows to the heat exchanger of the heat generating device and the low temperature radiator 32 where heat is absorbed from the heat generating device or outside air to the cooling water.

Further, heat of the refrigerant is transferred to the high temperature circuit 4 at the condenser 22, whereby the cooling water in the high temperature circuit 4 is warmed. After that, this high temperature cooling water is cooled by heat exchange with the surrounding air at the heater core 43. Along with this, the surrounding air is raised in temperature. Therefore, in the first heating mode, heat is absorbed from the outside air at the low temperature radiator 32, heat is sometimes absorbed from the heat generating device at the heat exchanger of the heat generating device, and that heat is discharged at the heater core 43.

Figure 12:
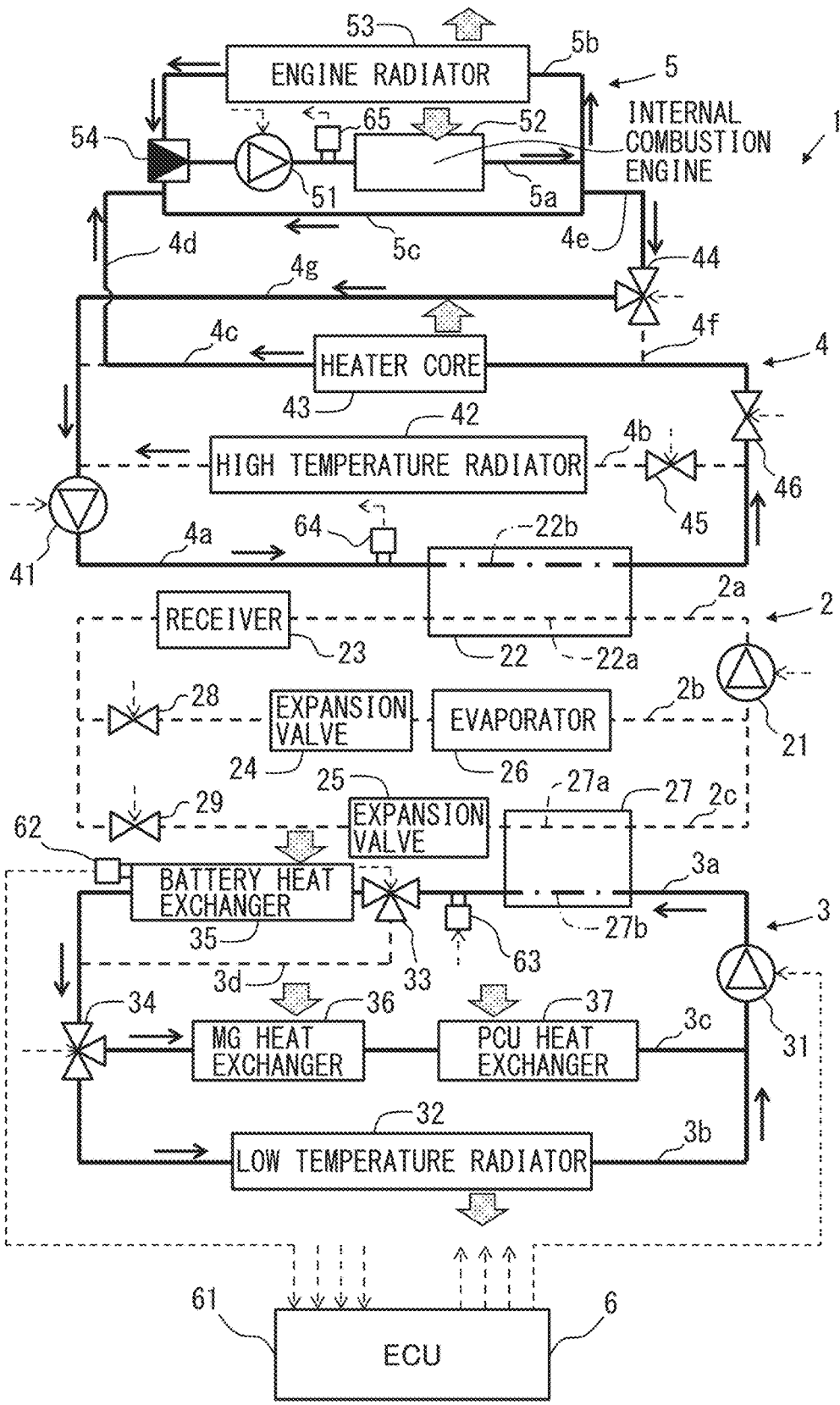
FIG. 12 shows an operating state of the vehicle-mounted temperature controller in the case where heating of the passenger compartment is demanded and the internal combustion engine is operated (second heating mode).

FIG. 12 shows an operating state of the vehicle-mounted temperature controller 1 in the case where heating of the vehicle compartment is demanded and the internal combustion engine is being operated (second heating mode).

As shown in FIG. 12, in the second heating mode, the compressor 21 is stopped. Therefore, refrigerant does not circulate in the refrigeration circuit 2. Further, as shown in FIG. 12, the first pump 31, second pump 41, and third pump 51 are all operated. Therefore, cooling water circulates in the low temperature circuit 3, high temperature circuit 4, and engine cooling circuit 5.

Further, in the second heating mode, the third solenoid regulating valve 45 is closed and the fourth solenoid regulating valve 46 is opened. Therefore, the cooling water in the high temperature circuit 4 flows through the condenser 22, then flows into the heater flow path 4*c*.

In addition, in the second heating mode, the third pump 51 of the engine cooling circuit 5 is driven and the third three-way valve 44 is set to the second state. Therefore, the engine outflow flow path 4*e* is communicated with the core downstream side communication path 4*g*. As a result, part of the cooling water flowing out from the heater core 43 flows through the engine inflow flow path 4*d* and flows into the engine cooling circuit 5. Further, in the engine cooling circuit 5, part of the cooling water flowing out from the cooling water flow path of the internal combustion engine 52 flows through the engine outflow flow path 4*e* and the core downstream side communication path 4*g*, and flows into the heater flow path 4*c* at the downstream side of the heater core 43. That is, part of this cooling water flows into the core downstream side part. Therefore, the cooling water warmed at the cooling water flow path of the internal combustion engine 52 flows through the cooling water piping 22*b* of the condenser 22, then flows into the heater core 43.

In addition, in the second heating mode, the cooling water in the low temperature circuit 3, in the same way as the first stopping mode, circulates in the low temperature circuit 3. Therefore, in the second heating mode, heat is absorbed from the heat generating device at the heat exchanger of the heat generating device and that heat is discharged at the low temperature radiator 32.

As a result, in the second heating mode, part of the cooling water in the engine cooling circuit 5 raised in temperature by the heat of the internal combustion engine at the cooling water flow path of the internal combustion engine 52 flows through the engine outflow flow path 4e and flows into the high temperature circuit 4. This high temperature cooling water flows through the core downstream side communication path 4g and the cooling water piping 22b of the condenser 22 and flows into the heater core 43. The cooling water flowing into the heater core 43 is cooled by exchange of heat with the surrounding air at the heater core 43. Along with this, the surrounding air is raised in temperature. Therefore, at the second heating mode, heat is absorbed from the internal combustion engine at the cooling water flow path of the internal combustion engine 52, and that heat is discharged at the heater core 43. In addition, in the second heating mode, heat is absorbed from the heat generating device at the heat exchanger of the heat generating device, and that heat is discharged at the low temperature radiator 32.

Control of Solenoid Regulating Valves

Figure 13:
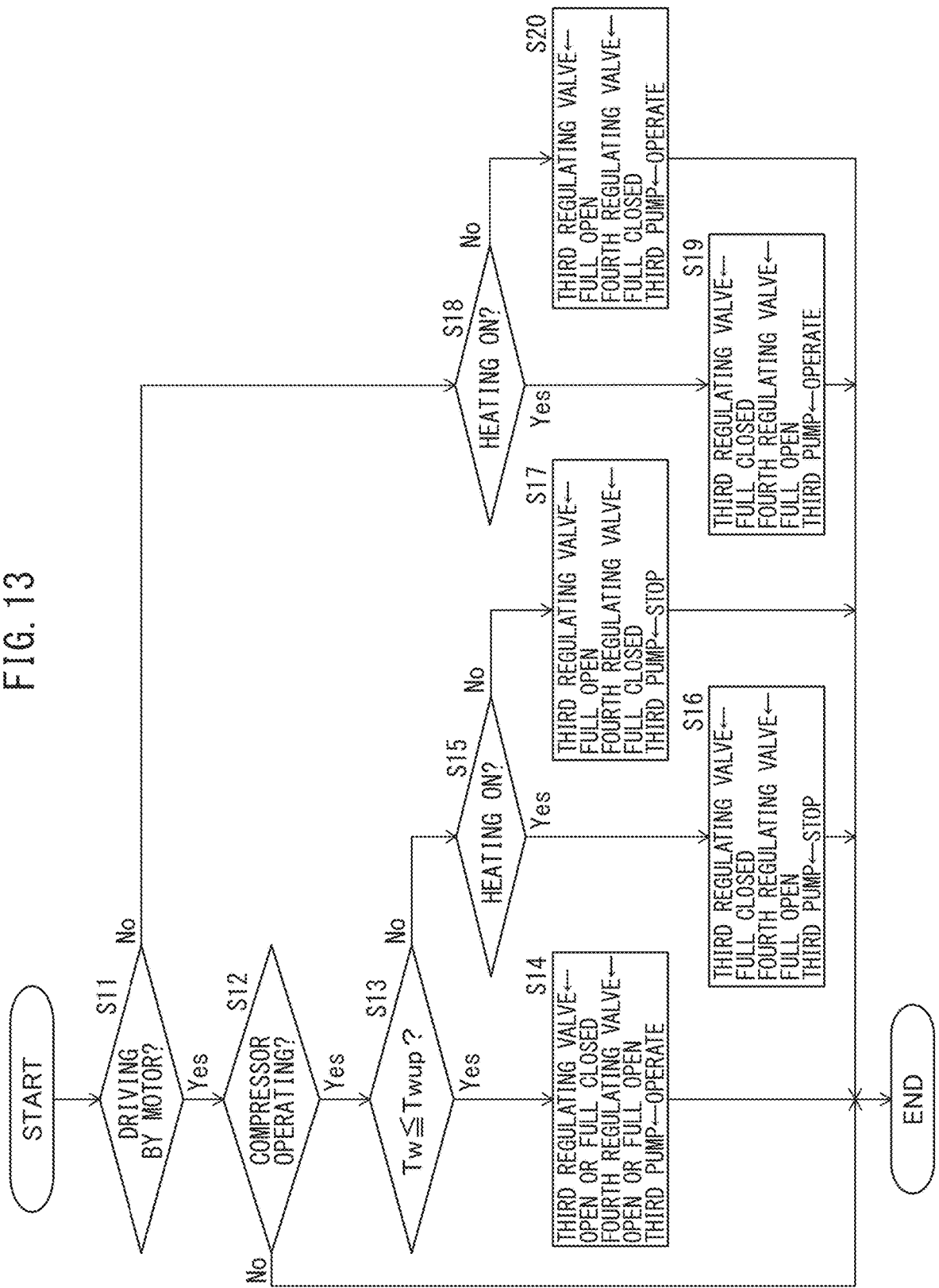
FIG. 13 is a flow chart showing a control routine for controlling a third solenoid regulating valve, forth solenoid regulating valve, and third pump.

FIG. 13 is a flow chart showing a control routine for control of the third solenoid regulating valve 45, fourth solenoid regulating valve 46, and third pump 51. The illustrated control routine is executed every certain time interval.

First, at step S11, it is determined if the vehicle 100 is being driven by the motor without relying on the internal combustion engine 52. Whether or not the vehicle 100 is being driven by the motor is, for example, determined based on a control signal from the ECU controlling the drive operation of the internal combustion engine 52 or motor. When the vehicle 100 is being driven by the motor without relying on the internal combustion engine 52, basically the internal combustion engine 52 is stopped, and the motor, MG, PCU, and other heat generating devices generate heat. Accordingly, at the heat exchangers of these heat generating devices, heat is discharged from these heat generating devices to the cooling water of the low temperature circuit 3. If, at step S11, it is determined that the internal combustion engine 52 has been stopped and the vehicle 100 is being driven by the motor without relying on the internal combustion engine 52, the control routine proceeds to step S12.

At step S12, it is determined whether the compressor 21 is operating, that is, whether the refrigeration cycle is being performed at the refrigeration circuit 2. Therefore, it can be said that, at step S12, it is determined whether heat is being transferred from the cooling water of the low temperature circuit 3 to the refrigerant at the chiller 27 and whether heat is being transferred from the refrigerant to the cooling water of the high temperature circuit 4 at the condenser 22. If it is determined that the compressor 21 is not operating, the third solenoid regulating valve 45 and the fourth solenoid regulating valve 46 are maintained as they are without particularly being adjusted, and the control routine is ended. In this case, the first stopping mode where the internal combustion engine 52 is stopped (see FIG. 5) is performed.

On the other hand, if, at step S12, it is determined that the compressor 21 is operating, the control routine proceeds to step S13. At step S13, it is determined if temperature Tw of the cooling water detected by the third water temperature sensor 65 (that is, the temperature of the cooling water flowing into the cooling water flow path of the internal combustion engine 52) is equal to or less than a predetermined upper limit temperature Twup. The upper limit temperature Twup is, for example, set to a temperature equal to or slightly lower than the temperature which the cooling water of the engine cooling circuit 5 reaches when the internal combustion engine 52 finishes being warmed up.

If, at step S13, it is determined that the temperature of the cooling water Tw is equal to or less than the upper limit temperature Twup, that is, if the internal combustion engine 52 has to be warmed up, the control routine proceeds to step S14. In this case, the warmup mode (see FIG. 8) is performed. Therefore, at step S14, the third solenoid regulating valve 45 is opened, the fourth solenoid regulating valve 46 is opened, and the third pump 51 is operated. The opening degrees of the third solenoid regulating valve 45 and the fourth solenoid regulating valve 46 at this time are controlled in accordance with the temperature of the cooling water detected by the third water temperature sensor 65.

Figure 14:
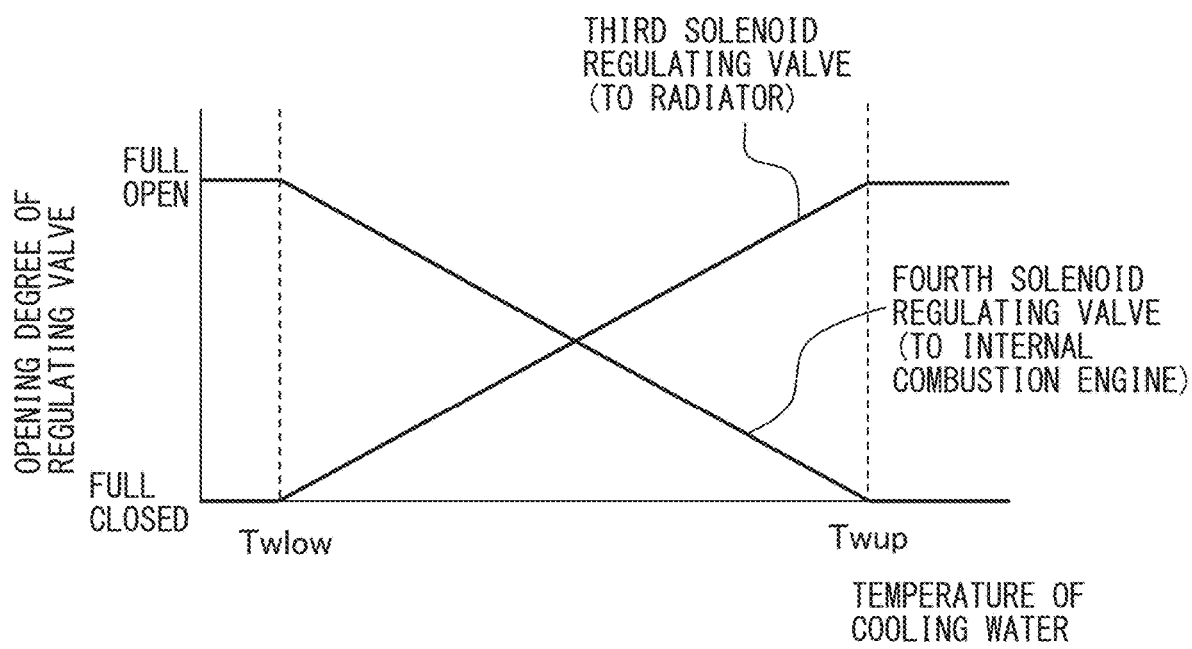
FIG. 14 is a view showing the relationship between the temperature of the cooling water flowing into the cooling water flow path of the internal combustion engine and the opening degrees of the third solenoid regulating valve and the fourth solenoid regulating valve.

FIG. 14 shows the relationship between the temperature of the cooling water flowing into the cooling water flow path of the internal combustion engine 52 and the opening degrees of the third solenoid regulating valve 45 and the fourth solenoid regulating valve 46. As shown in FIG. 14, when the temperature of the cooling water Tw is lower than the lower limit temperature Twlow, the third solenoid regulating valve 45 is set to full closed and the fourth solenoid regulating valve 46 is set to full open. If the temperature of the cooling water Tw becomes equal to or greater than the lower limit temperature Twlow, along with the rise of the temperature of the cooling water, the opening degree of the third solenoid regulating valve 45 gradually becomes larger, while the opening degree of the fourth solenoid regulating valve 46 gradually becomes smaller. Further, if the temperature of the cooling water Tw becomes the upper limit temperature Twup, the third solenoid regulating valve 45 is set to full open and the fourth solenoid regulating valve 46 is set to full closed.

On the other hand, if, at step S13, it is determined that the temperature of the cooling water Tw is higher than the upper limit temperature Twup, that is, if the internal combustion engine 52 does not have to be warmed up, the control routine proceeds to step S15. At step S15, it is determined if the heating demand of the vehicle 100 is set to ON. The ON/OFF state of the heating demand of the vehicle 100 may, for example, be automatically switched based on the temperature setting of the user, temperature in the vehicle compartment, etc., or may be directly switched by the user, for example, by a switch.

If, at step S15, it is determined that the heating demand of the vehicle 100 is set to ON, the control routine proceeds to step S16. In this case, the first heating mode shown in FIG. 11 is performed. Therefore, at step S16, the third solenoid regulating valve 45 is set to full closed, the fourth solenoid regulating valve 46 is set to full open, and the third pump 51 is stopped. On the other hand, if at step S15 it is determined that the heating demand of the vehicle 100 is set to OFF, the control routine proceeds to step S17. In this case, the second stopping mode where the internal combustion engine 52 is stopped (see FIG. 7), the first cooling mode where the internal combustion engine 52 is stopped, or the second cooling mode where the internal combustion engine 52 is stopped, is performed. Therefore, at step S17, the third solenoid regulating valve 45 is set to full open, the fourth solenoid regulating valve 46 is set to full closed, and the third pump 51 is stopped.

On the other hand, if at step S11 it is determined that the vehicle 100 is being driven by the internal combustion engine 52, the control routine proceeds to step S18. At step S18, similarly to step S15, it is determined if the heating request of the vehicle 100 is set to ON. If, at step S18, the heating request of the vehicle 100 is set to ON, the control routine proceeds to step S19. In this case, the second heating mode (see FIG. 12) is performed. Therefore, at step S19, the third solenoid regulating valve 45 is set to full closed, the fourth solenoid regulating valve 46 is set to full open, and the third pump 51 is operated. On the other hand, if, at step S18, it is determined that the heating demand of the vehicle 100 is set to OFF, the control routine proceeds to step S20. In this case, the first stopping mode where the internal combustion engine 52 is operating (see FIG. 4), the second stopping mode where the internal combustion engine 52 is operating (see FIG. 6), the first cooling mode where the internal combustion engine 52 is stopped (see FIG. 9), or the second cooling mode where the internal combustion engine 52 is stopped (see FIG. 10), is performed. Therefore, at step S20, the third solenoid regulating valve 45 is set to full open, the fourth solenoid regulating valve 46 is set to full closed, and the third pump 51 is operated.

Action and Effect

In the present embodiment, when heat is being discharged from a heat generating device in the heat exchanger of the heat generating device to cooling water in the low temperature circuit 3 while the internal combustion engine 52 is stopped and when heat is being transferred from the cooling water of the low temperature circuit 3 to the refrigerant in the chiller 27 along with operation of the compressor 21, stopping control is performed to open the fourth solenoid regulating valve 46. In the stopping control, cooling water of the high temperature circuit 4 raised in temperature by absorption of heat from the refrigerant at the condenser 22 flows into the cooling water flow path of the internal combustion engine 52.

Therefore, according to the present embodiment, when warming up the internal combustion engine 52 while the internal combustion engine 52 is stopped, heat is not absorbed from the outside air. Rather, heat is absorbed from a heat generating device, which is higher in temperature than the outside air, to raise the temperature of the cooling water flowing into the internal combustion engine 52. As a result, the internal combustion engine 52 can be efficiently warmed up.

Further, in a hybrid vehicle, when driven by the motor, the amount of heat generated at the motor, PCU, battery, and other heat generating devices is great. Accordingly, these heat generating devices are higher in temperature. Further, if these heat generating devices become excessively high in temperature, performance thereof decreases or deteriorates. In the present embodiment, when warming up the internal combustion engine 52 while the internal combustion engine 52 is stopped, these heat generating devices are cooled, therefore the heat generating devices can be kept from excessively rising in temperature. In particular, in the present embodiment, stopping control is performed when the internal combustion engine 52 is stopped and the vehicle 100 is driven by the motor, therefore it is possible to more effectively keep the heat generating devices from excessively rising in temperature.

On the other hand, in the present embodiment, even when the internal combustion engine 52 has been stopped and heat is discharged in the heat exchanger of the heat generating device from the heat generating device to the cooling water of the low temperature circuit 3 and, along with operation of the compressor 21, the heat is transferred from the cooling water of the low temperature circuit 3 to the refrigerant at the chiller 27, if the temperature of the cooling water at the cooling water flow path of the internal combustion engine 52 is higher than the upper limit temperature, the flow of cooling water of the cooling water flow path of the internal combustion engine 52 is basically stopped. Therefore, when the internal combustion engine 52 is sufficiently warmed up and the internal combustion engine 52 does not have to be raised in temperature any further, high temperature cooling water stops being supplied to the internal combustion engine 52.

Further, in the present embodiment, the third solenoid regulating valve 45 and the fourth solenoid regulating valve 46 can control the ratio of the cooling water, flowing out from the cooling water piping 22b of the condenser 22, flowing into the high temperature radiator flow path 4b and the heater flow path 4c. Further, when the third pump 51 is operated, part of the cooling water flowing into the heater flow path 4c flows into the cooling water flow path of the internal combustion engine 52. Therefore, the third solenoid regulating valve 45 and the fourth solenoid regulating valve 46 can control the ratio of the cooling water, flowing out from the cooling water piping 22b of the condenser 22, flowing into the high temperature radiator 42 and the cooling water flow path of the internal combustion engine 52.

Further, in the present embodiment, in stopping control, when the internal combustion engine 52 is stopped and heat is discharged from a heat generating device to cooling water of the low temperature circuit 3 in the heat exchanger of the heat generating device and heat is transferred from the cooling water of the low temperature circuit 3 to the refrigerant at the chiller 27, if the temperature of the cooling water in the cooling water flow path of the internal combustion engine 52 is relatively high, compared to if the temperature of the cooling water is relatively low, the ratio of the cooling water in the high temperature circuit 4 flowing into the high temperature radiator 42 is made higher.

As a result, according to the present embodiment, as the temperature of the cooling water flowing through the cooling water flow path of the internal combustion engine 52 rises, the rate of rise of the temperature of the cooling water can be gradually decreased. As a result, it is possible to keep the temperature of the cooling water in the cooling water flow path of the internal combustion engine 52 from excessively rising.

Above, a preferred embodiment according to the present invention was explained, but the present invention is not limited to that embodiment. Various corrections and changes may be made within the language of the claims.

REFERENCE SIGNS LIST 1. vehicle-mounted temperature controller
2. refrigeration circuit
3. low temperature circuit
4. high temperature circuit
5. engine cooling circuit
6. control device
7. air flow path
22. condenser
27. chiller
44. third three-way valve

The invention claimed is:

1. A vehicle-mounted temperature controller, comprising:
a first heat circuit having a heat exchanger for a heat generating device, exchanging heat with the heat generating device and having a first heat exchanger, and configured so that a first heat medium is circulated through them, a second heat circuit having a heat medium flow path of an internal combustion engine and having a second heat exchanger, and configured so that a second heat medium is circulated through them, and a refrigeration circuit having the first heat exchanger making a refrigerant absorb heat from the first heat medium to make the refrigerant evaporate and the second heat exchanger making the refrigerant discharge heat to the second heat medium to make the refrigerant condense, and configured to realize a refrigeration cycle by the refrigerant being circulated through them, wherein the second heat circuit further has a circulation mode control device controlling a mode of circulation of the second heat medium in the second heat circuit, and the circulation mode control device performs stopping control for controlling the circulation mode so that the second heat medium raised in temperature by absorbing heat from the refrigerant at the second heat exchanger flows into the heat medium flow path of the internal combustion engine, when the internal combustion engine is stopped and heat is discharged from the heat generating device to the first heat medium in the heat exchanger for the heat generating device and heat is absorbed from the first heat medium to the refrigerant in the first heat exchanger, wherein in the stopping control, the circulation mode control device controls the circulation mode so that even when the internal combustion engine is stopped and heat is discharged from the heat generating device to the first heat medium in the heat exchanger for the heat generating device and heat is absorbed from the first heat medium to the refrigerant in the first heat exchanger, if the temperature of the second heat medium in the heat medium flow path of the internal combustion engine is higher than a predetermined upper limit temperature, the second heat medium does not flow into the heat medium flow path of the internal combustion engine.

2. A vehicle-mounted temperature controller, comprising:

a first heat circuit having a heat exchanger for a heat generating device, exchanging heat with the heat generating device and having a first heat exchanger, and configured so that a first heat medium is circulated through them, a second heat circuit having a heat medium flow path of an internal combustion engine and having a second heat exchanger, and configured so that a second heat medium is circulated through them, and a refrigeration circuit having the first heat exchanger making a refrigerant absorb heat from the first heat medium to make the refrigerant evaporate and the second heat exchanger making the refrigerant discharge heat to the second heat medium to make the refrigerant condense, and configured to realize a refrigeration cycle by the refrigerant being circulated through them, wherein the second heat circuit further has a circulation mode control device controlling a mode of circulation of the second heat medium in the second heat circuit, and the circulation mode control device performs stopping control for controlling the circulation mode so that the second heat medium raised in temperature by absorbing heat from the refrigerant at the second heat exchanger flows into the heat medium flow path of the internal combustion engine, when the internal combustion engine is stopped and heat is discharged from the heat generating device to the first heat medium in the heat exchanger for the heat generating device and heat is absorbed from the first heat medium to the refrigerant in the first heat exchanger, wherein the second heat circuit further has a radiator exchanging heat between the atmosphere and the second heat medium, the circulation mode control device is configured to control a ratio of the second heat medium flowing out from the second heat exchanger to the radiator and to the heat medium flow path of the internal combustion engine, and in the stopping control, the circulation mode control device controls the ratio so that when the internal combustion engine is stopped and heat is discharged from the heat generating device to the first heat medium in the heat exchanger for the heat generating device and heat is absorbed from the first heat medium to the refrigerant in the first heat exchanger, if the temperature of the second heat medium in the heat medium flow path of the internal combustion engine is relatively high, compared to if the temperature of the second heat medium is relatively low, the ratio of the second heat medium flowing into the radiator is higher.

3. The vehicle-mounted temperature controller according to claim 1, wherein the vehicle-mounted temperature controller is mounted in a vehicle having the internal combustion engine and a motor as drive sources, and the stopping control is performed when the internal combustion engine is stopped and the vehicle is driven by the motor.

4. The vehicle-mounted temperature controller according to claim 2, wherein the vehicle-mounted temperature controller is mounted in a vehicle having the internal combustion engine and a motor as drive sources, and the stopping control is performed when the internal combustion engine is stopped and the vehicle is driven by the motor.

\* \* \* \* \*